United States Patent
Yoshida et al.

(10) Patent No.: US 10,171,692 B2
(45) Date of Patent: Jan. 1, 2019

(54) MULTIFUNCTION PERIPHERAL

(71) Applicant: Sharp Kabushiki Kaisha, Sakai, Osaka (JP)

(72) Inventors: Mayuko Yoshida, Sakai (JP); Yuichi Nishii, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/263,517

(22) Filed: Sep. 13, 2016

(65) Prior Publication Data
US 2017/0085729 A1   Mar. 23, 2017

(30) Foreign Application Priority Data

Sep. 17, 2015 (JP) .................... 2015-183593
Sep. 17, 2015 (JP) .................... 2015-183594
Jun. 8, 2016 (JP) .................... 2016-114347

(51) Int. Cl.
| G06F 3/0481 | (2013.01) |
| G06F 3/12 | (2006.01) |
| G06F 3/14 | (2006.01) |
| H04N 1/00 | (2006.01) |
| G06K 15/02 | (2006.01) |

(52) U.S. Cl.
CPC ..... *H04N 1/00474* (2013.01); *H04N 1/00413* (2013.01); *H04N 1/00482* (2013.01); *G06F 3/04817* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 9,317,148 B2 * | 4/2016 | Arakawa | G06F 3/041 345/173 |
| 2001/0026290 A1 * | 10/2001 | Machida | H04N 1/00411 715/810 |
| 2007/0074113 A1 * | 3/2007 | Ikeno | H04N 1/00384 715/700 |
| 2008/0215978 A1 * | 9/2008 | Bamba | G06F 3/0482 715/713 |
| 2010/0027055 A1 * | 2/2010 | Mori | H04N 1/00411 358/1.15 |

(Continued)

FOREIGN PATENT DOCUMENTS

| JP | 2009-177526 A | 8/2009 |
| JP | 2009-182777 A | 8/2009 |

(Continued)

*Primary Examiner* — Beniyam Menberu
(74) *Attorney, Agent, or Firm* — Keating & Bennett, LLP

(57) ABSTRACT

A multifunction peripheral comprises an operating panel, and a home screen for performing selection of an operation mode, etc. on the operating panel is displayed if a home button is operated. If selecting a simple copy button in the home screen, for example, a copy screen is displayed on the operating panel. Furthermore, if selecting a simple facsimile button in the home screen, a fax screen is displayed on the operating panel. Furthermore, if selecting a simple scan button in the home screen, a scan screen is displayed on the operating panel. Layout of the home screen and layout of each of the copy screen, the facsimile screen and the scan screen are similar to each other.

9 Claims, 16 Drawing Sheets

(56) References Cited

U.S. PATENT DOCUMENTS

| | | | |
|---|---|---|---|
| 2010/0027059 A1* | 2/2010 | Ebi | H04N 1/0035 358/1.15 |
| 2010/0027060 A1* | 2/2010 | Ogino | H04N 1/00411 358/1.15 |
| 2011/0199629 A1* | 8/2011 | Sensu | H04N 1/00411 358/1.13 |
| 2012/0033255 A1* | 2/2012 | Touyamasaki | H04N 1/00395 358/1.15 |
| 2012/0069377 A1* | 3/2012 | Narimatu | H04N 1/00411 358/1.13 |
| 2012/0099129 A1* | 4/2012 | Ogino | G06F 3/04883 358/1.13 |
| 2013/0271402 A1* | 10/2013 | Arakawa | G06F 3/041 345/173 |
| 2014/0320904 A1* | 10/2014 | Ikebata | G03G 15/50 358/1.15 |
| 2014/0362407 A1 | 12/2014 | Sasaki et al. | |
| 2016/0065766 A1* | 3/2016 | Miyamoto | H04N 1/00506 358/1.13 |
| 2016/0291812 A1* | 10/2016 | Ogura | G06F 3/0482 |

FOREIGN PATENT DOCUMENTS

| | | |
|---|---|---|
| JP | 2012-098895 A | 5/2012 |
| JP | 2014-078159 A | 5/2014 |
| JP | 2014-241050 A | 12/2014 |

\* cited by examiner

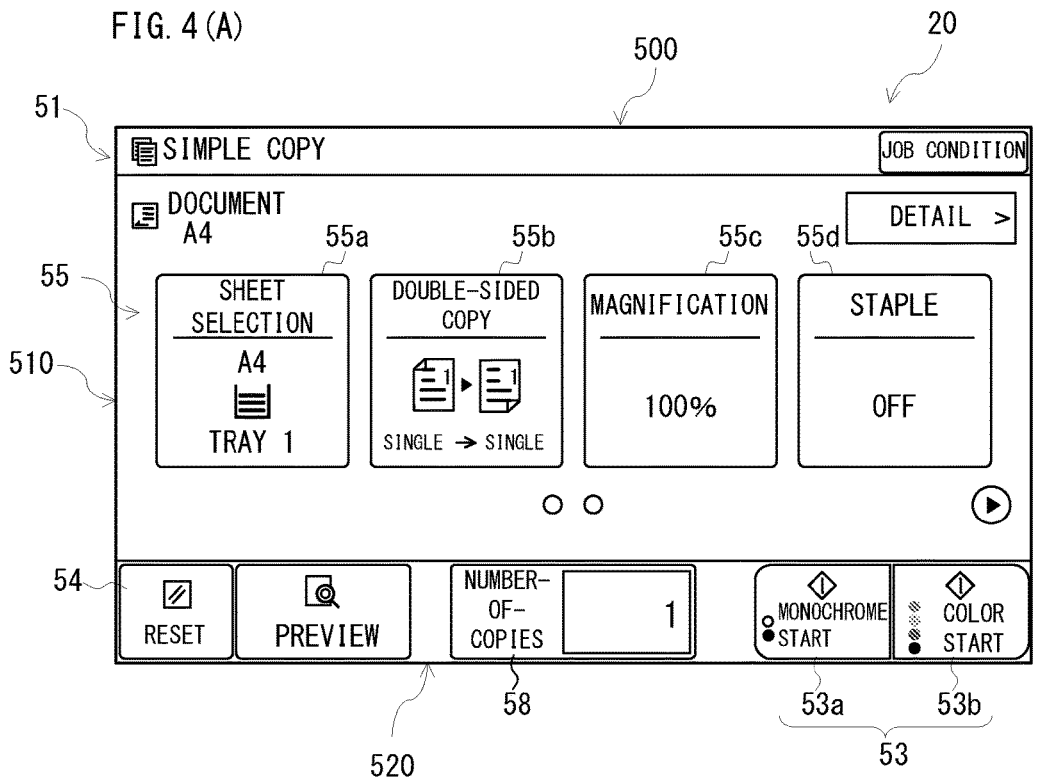
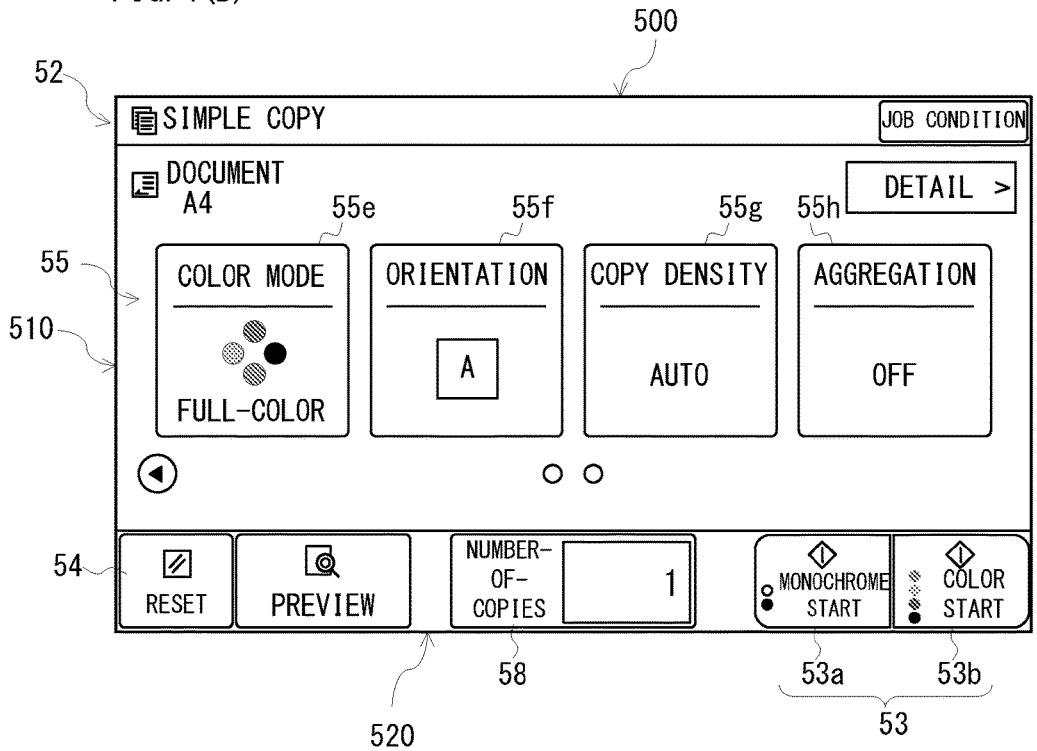

MULTIFUNCTION PERIPHERAL

CROSS REFERENCE OF RELATED APPLICATION

The disclosures of Japanese patent application Nos. 2015-183593 and 2015-183594 both filed on Sep. 17, 2015 and the disclosure of Japanese patent application No. 2016-114349 filed on Jun. 8, 2016 are incorporated by reference.

BACKGROUND OF THE INVENTION

Field of the Invention

The present invention relates to a multifunction peripheral, and more specifically, a multifunction peripheral comprising a display portion that has a display screen having corner portions and displays a user interface image for receiving a user operation.

Description of the Related Art

In image forming apparatuses, there is a multifunction peripheral (MFP) that combines a plurality of functions such as a copying function, a fax (facsimile) function, a scanner function, printer function, etc. into one set, and it is expected to obtain a large business impact with a small space.

On the other hand, in order to perform each function in the multifunction peripheral or image forming apparatus, specific setting through an operating portion thereof is required, it is predictable that there is a user having difficulty for operation. In Japanese patent application laying-open No. 2014-78159 [G06F 3/0482, G06F 3/12, G06F 3/0481, H04N 1/00, B41J 29/38] (literature 1) laid-open on May 1, 2014, for example, there is disclosed a technology capable of implementing an easy-to-use user interface even if a user is a beginner or an expert.

An image forming apparatus disclosed in this literature 1 comprises a plurality of operation modes such as a copy, a fax, etc., and a user is made to select which one of the operation modes is to be performed in a home screen, and when selecting a copy, for example, a beginner setting screen for performing operation setting in a copy mode is displayed. However, since screen layout including arrangement etc. of buttons or keys displayed on a screen is completely different between the home screen and the beginner setting screen, there is a possibility that a user is confused at the time of operation. Therefore, there is room for improvement.

SUMMARY OF THE INVENTION

Therefore, it is a primary object of the present invention to provide a novel multifunction peripheral.

Furthermore, it is another object of the present invention to provide a multifunction peripheral capable of reduce as much as possible confusion of a user at the time of operation.

A first invention is a multifunction peripheral having a plurality of operation modes, comprising a display portion configured to display a first user interface image for selecting an operation mode and a second user interface image for setting an operation condition in a selected operation mode, wherein the first user interface image has a plurality of first operating icons for selecting a plurality of operation modes, and includes a first display region that the plurality first operating icons are switchably displayed and a second display region that the plurality of first operating icons are fixedly displayed, and the second user interface image has a plurality of second operating icons for setting a plurality of operation conditions, and includes a third display region that the plurality second operating icons are switchably displayed and a fourth display region that the plurality of second operating icons are fixedly displayed, the first display region and the third display region have an overlapping area and the second display region and the fourth display region have an overlapping area.

A second invention is the multifunction peripheral according to the first invention, wherein the overlapping area has an area larger than an area of a non-overlapping area in each of the first display region and the third display region.

A third invention is the multifunction peripheral according to the first invention, wherein the overlapping area has an area larger than an area of a non-overlapping area in each of the second display region and the fourth display region.

A fourth invention is the multifunction peripheral according to the first invention, wherein an entire display region of the display portion is a rectangular shape, and the second display region and the fourth display region are provided along the same side of the entire display region.

A fifth invention is the multifunction peripheral according to the first invention, wherein an entire display region of the display portion is a rectangular shape, and the second display region and the fourth display region are provided in the same corner portion of the entire display region.

A sixth invention is the multifunction peripheral according to the first invention, wherein an arrangement of the plurality of first operating icons in the first display region and an arrangement of the plurality of second operating icons in the third display region are substantively the same.

A seventh invention is the multifunction peripheral according to the first invention, wherein a first number of the second operating icons displayed in the third display region is the same as or less than a second number of the first operating icons displayed in the first display region.

An eighth invention is the multifunction peripheral according to the first invention, wherein the plurality of second operating icons include a plurality of setting icons configured to set operation conditions, a start key configured to instruct performing image processing, and a reset key configured to instruct clearing set content of the operation conditions, and irrespective of the operation mode, the plurality of setting icons are displayed in the third display region, and the start key and the reset key are displayed in the fourth display region.

A ninth invention is the multifunction peripheral according to the eighth invention, wherein the start key is displayed in any one of the corner portions of the entire display region of the display portion, and the reset key is displayed in another one of the corner portions of the entire display region of the display portion.

The above mentioned objects and other objects, features, aspects and advantages of the present invention will become more apparent from the following detailed description of the present invention when taken in conjunction with the accompanying drawings.

BRIEF DESCRIPTION OF THE DRAWINGS

FIGS. 4(B) and 4(B) are explanatory views showing a basic screen of a simple copy mode.

DETAILED DESCRIPTION OF NON-LIMITING EXAMPLE EMBODIMENTS

Figure 1:
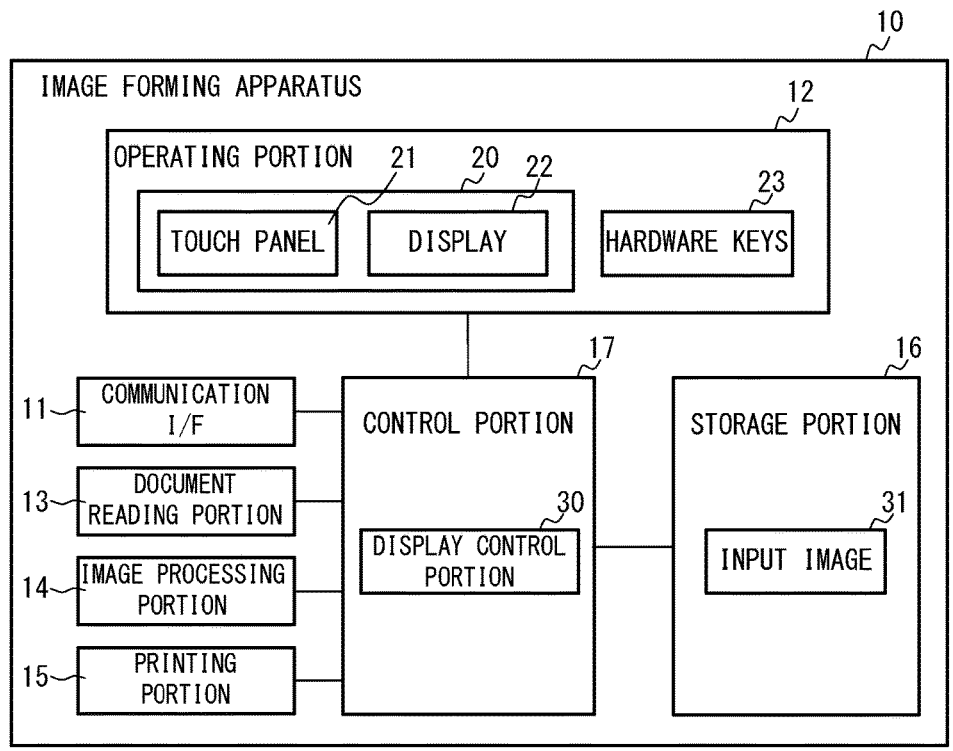
FIG. 1 is a structural view of an image forming apparatus according to the present invention.
Figure 2:
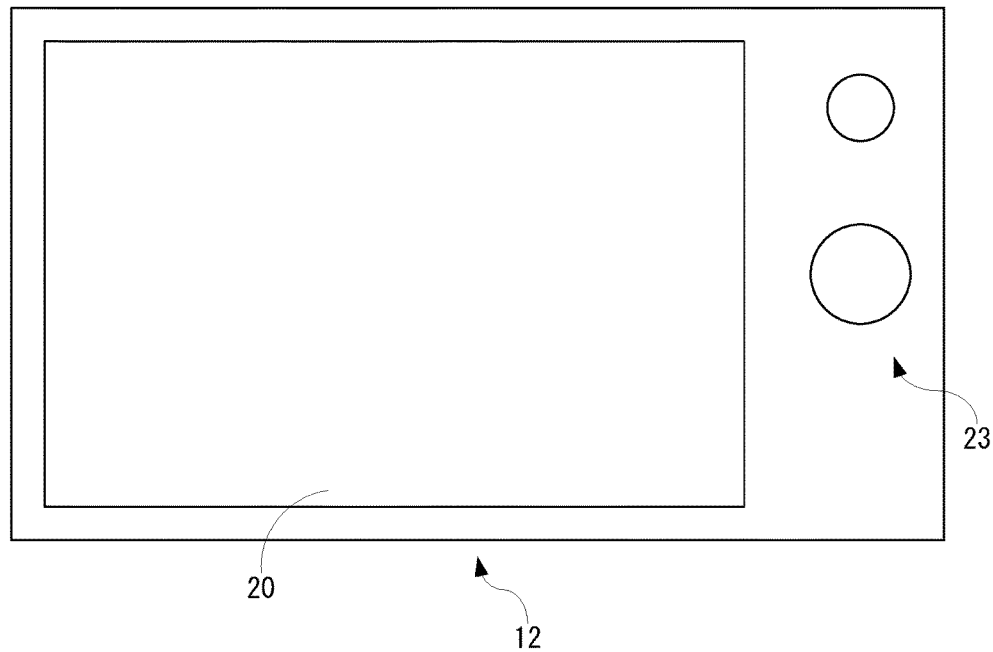
FIG. 2 is an explanatory view showing an operating portion.

In the following, an image forming apparatus according to the present invention will be described with reference to drawings. FIG. 1 is a structural view of the image forming apparatus according to the present invention, and FIG. 2 is an explanatory view of an operating portion of FIG. 1.

As shown in FIG. 1, the image forming apparatus 10 has a communication I/F 11, an operating portion 12, a document reading portion 13, an image processing portion 14, a printing portion 15, a storage portion 16, a control portion 17, etc., and these are connected to via a bus(es).

The control portion 17 is constituted communicably with external apparatuses (illustration omitted) via the communication I/F 11. The communication I/F 11 comprises a fax (facsimile) communication portion, an infrared communication portion, etc., for example.

The control portion 17 comprises one or more CPUs (Central Processing Unit), for example, and loads to a RAM various kinds of programs and data that are stored in a ROM of the storage portion 16, and executes this loaded programs in the RAM, whereby an overall operation of the image forming apparatus 10 can be controlled based on a content designated or instructed by a user while processing data.

The document reading portion 13 is constituted so that a document that is set to a predetermined position can be optically read, and an image of the read document is output to the image processing portion 14 via the control portion 17.

The operating portion 12 is arranged in this side (near side) from the document reading portion 13, for example, and comprises an operating panel 20 that includes a liquid crystal display 22 and a touch panel 21 of a transparent resistance film system, and hardware keys 23 using contacts as shown also in FIG. 2.

The touch panel 21 is formed so as to overlap the display 22, and the operating panel 20 of this embodiment is formed in a shape of a laterally elongated rectangular. That is, a shape of a whole of a display region (entire display region) of the operating panel 20 (display 22) is a rectangular shape. The touch panel 21 receives a touch operation (touch input) by a user, and applies (inputs) coordinate data corresponding to a touch position to the control portion 17.

A user interface image for receiving a user operation to the image forming apparatus 10 can be displayed on the operating panel 20. In addition, the operating panel 20 corresponds to a display portion of the present invention. Furthermore, it is also possible to form the operating panel 20 in a shape of a longitudinally elongated rectangular.

Furthermore, the hardware keys 23 apply (input) operation data according to a key or button that a user operates to the control portion 17. For example, the hardware keys 23 include a home button for instructing displaying of a home screen, and a power saving button for instructing setting and cancellation (return to a normal mode) of a power saving mode.

The image processing portion 14 performs various kinds of processing transmission data sent from an external apparatus, data that a document is read by the document reading portion 13, etc., thereby to produce image data. This produced image data can be output to the printing portion 15. The above-described transmission data, data that is read from a document and produced image data are stored in an input image area 31 of the storage portion 16.

The printing portion 15 is configured to be able to perform printing by performing sheet feeding, image forming, transfer, fixing, sheet discharge, etc., and can print image data from the image processing portion 14 on a sheet.

Furthermore, the control portion 17 comprises a display control portion 30, for example. The display control portion 30 can adjust a displaying content of the operating panel 20, and makes the operating panel 20 display a start key for starting a predetermined operation or action of the image forming apparatus 10, a reset key for stopping setting concerning a predetermined operation or action of the image forming apparatus 10, a function selection image(s) for making a user select a function to be performed by the image forming apparatus 10, etc.

Figure 3A:
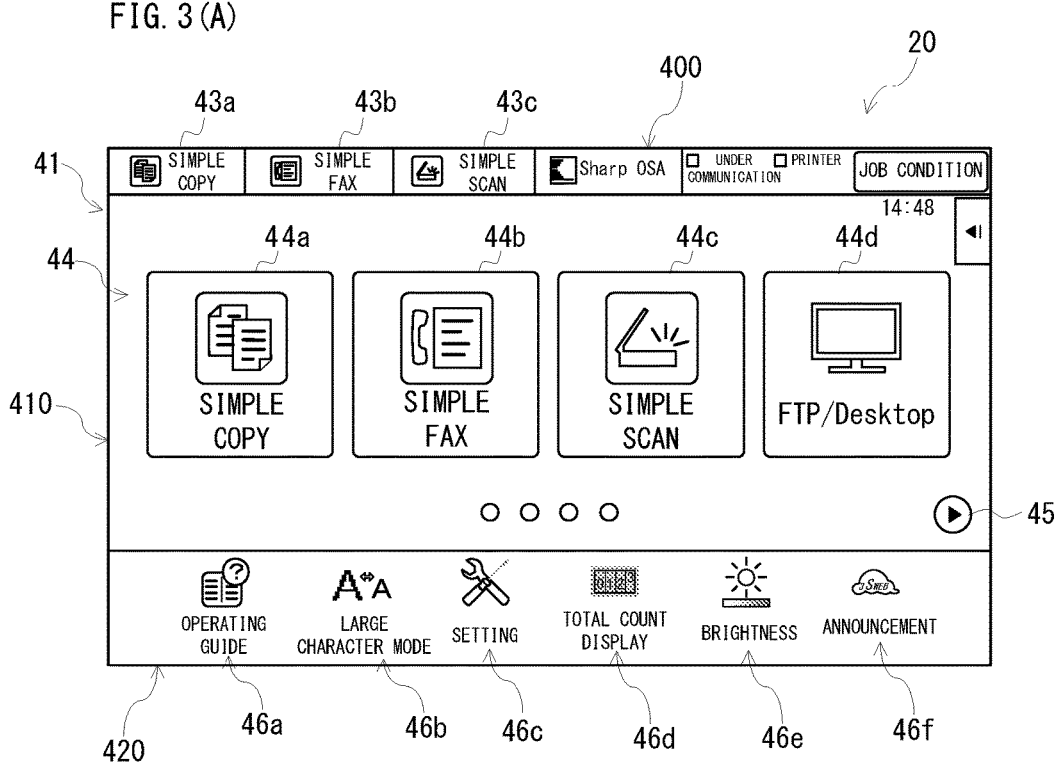
FIGS. 3(A) and 3(B) are explanatory views showing a home screen.
Figure 3B:
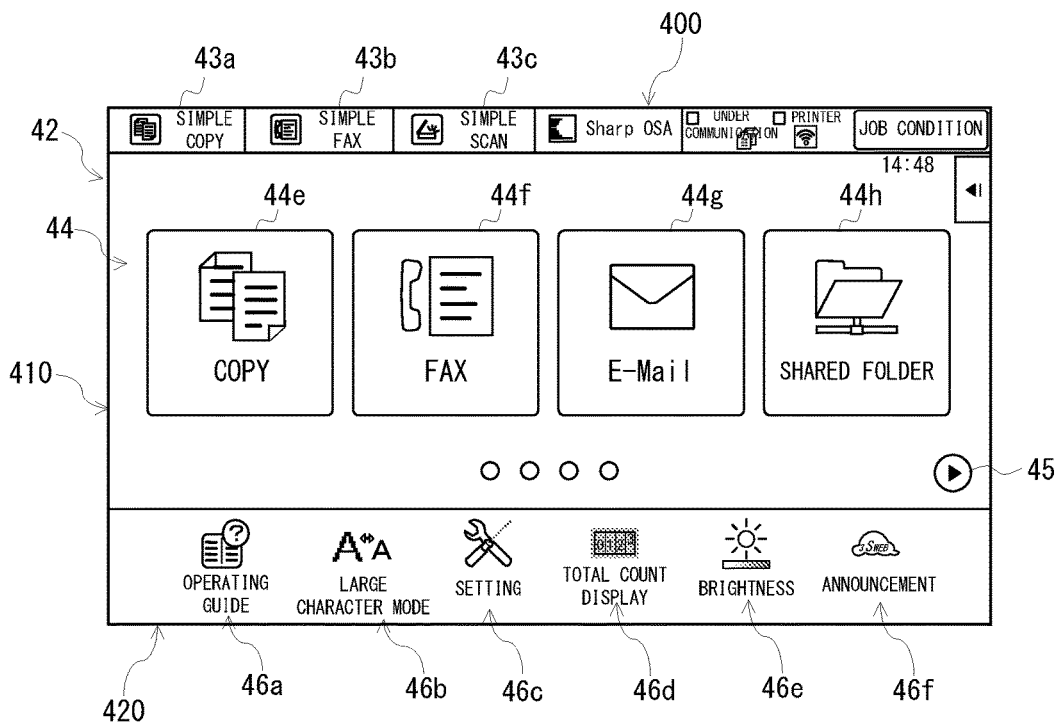

FIGS. 3(A) and 3(B) are explanatory views of a home screen displayed on the operating panel 20 explained with FIG. 2.

In the image forming apparatus 10, in order to make a user easy to operate, a simple mode is provided separately from a conventional setting mode (also called, a normal mode). In the following description, an image(s) for selecting a button(s), a key(s), or a function(s) displayed on the operating panel 20 is also called an icon(s) (operating icon(s)).

In the simple mode, it is possible to set and perform a job only according to a display content on the operating panel 20. In detail, the home screen is divided into a home first screen 41 shown in FIG. 3(A) and a home second screen 42 shown in FIG. 3(B), for example, and it is possible to perform transition between the home first screen 41 and the home second screen 42 by a tap operation to an arrow mark button 45 or a flick operation to the home first home screens 41 and the home second screen 42.

A system region 400 that is extended in a lateral or horizontal direction with a belt-like shape (rectangular shape) is formed in an upper end portion of each of the home screens 41 and 42. The system region 400 is provided with a simple copy button 43a, a simple fax button 43b, a simple scan button 43c, etc. for selecting each operation mode.

Below the system region 400, a display region 410 for displaying menu images 44 for selecting each operation mode is formed. A simple copy button 44a, a simple fax button 44b, a simple scan button 44c and an FTP/Desktop button 44d are provided in the home first screen 41, and a copy button 44e, a fax button 44f, an E-Mail button 44g and a shared folder button 44h are provided in the home second screen 42.

The simple copy button 43a, the simple fax button 43b, the simple scan button 43c in the system region 400, and the simple copy button 44a, the simple fax button 44b and the simple scan button 44c in the home first screen 41 correspond to a transition or shifting button to the simple mode. Thus, in this embodiment, it is possible to perform transition to the simple mode from the system region 400 in each of the home screens 41 and 42, or the menu images 44 of the home first screen 41.

Furthermore, on each of the home screens 41 and 42, a display region 420 provided with button images 46a, 46b, 46c, 46d, 46e and 46f for selecting other menus different from the operation mode is provided below the display region 410. The display region 420 has a shape of a laterally elongated rectangular, for example, and is displayed on a lower end portion of each of the home screens 41 and 42. The above-described button images 46a-46f are displayed in this display region 420 side by side in the lateral or horizontal direction.

Although a detailed description is omitted, the button image 46a is provided in order to display an operation guide. The button image 46b is provided in order to set a character size of the character to be displayed on the operating panel 20. The button image 46c is provided in order to set a language of characters to be displayed on the operating panel 20. The button image 46d is provided in order to display a total number of sheets used up to now. The button image 46e is provided in order to adjust luminosity (display brightness) of the operating panel 20 (display 22). The button image 46f is provided in order to display announcements from manufacturer or distributor of this image forming apparatus 10.

In addition, the number and functions of these button images 46a-46f are an example, and do not need to be limited. These can be suitably changed according to a kind of image forming apparatus 10, etc. Furthermore, it is also possible to make the user select the button images 46a-46f to be displayed.

First Embodiment

FIGS. 4(A) and 4(B) are explanatory views of a basic screen in the simple copy mode.

If selecting the simple copy button 43a or the simple copy button 44a shown in FIGS. 3(A) and 3(B), a copy first screen 51 shown in FIG. 4(A) is displayed. Furthermore, transition from the copy first screen 51 to a copy second screen 52 shown in FIG. 4(B) can be performed by a flick operation etc. The copy first screen 51 and the copy second screen 52 are screens for setting operation conditions such as sheet selection, double-sided copy, magnification, staple function, color mode, orientation of image, copying density, page aggregation (N-in-1), etc. when the operation mode is the simple copy mode.

A display region 500 for indicating that the operation mode is the simple copy mode is formed in an upper end portion of the copy first screen 51, and a display region 510 for displaying function selection images 55 is provided below this display region 500. Furthermore, a display region 520 for displaying a start key 53, a reset key 54, etc. is provided below this display region 510 and in a lower end portion of the copy first screen 51. Each of the display regions 500, 510 and 520 has a shape of a laterally elongated rectangular.

The start key 53 is displayed in any one of corner areas or corner portions of the copy first screen 51. For example, the start key 53 is displayed on a corner area at the lower right of the copy first screen 51, that is, an area at a right end of the display region 520. The start key 53 is provided in a shape of a laterally elongated rectangular. Furthermore, the start key 53 is divided into right and left portions at an approximately center thereof, and a monochrome start key 53a is provided in the left, and a color start key 53b is provided in the right.

On the other hand, the reset key 54 is displayed in a corner area different from the corner area where the start key 53 is displayed among the corner areas of the copy first screen 51. That is, the reset key 54 is displayed in a corner area at the lower left of the copy first screen 51, that is, an area at the left end of the display region 520. The reset key 54 is provided in a shape of a laterally elongated rectangular, and it is provided in size a little smaller than the monochrome start key 53a (or color start key 53b).

Since the start key 53 and the reset key 54 are thus formed with software keys, change of specifications such as an arrangement, a shape, etc. becomes easy. Furthermore, an operation start or suspension of setting of the image forming apparatus 10 can be attained by a tap operation to the display screen.

Furthermore, although the start key 53 and the reset key 54 are keys that lead to completely different results, since these are displayed on different corner areas in the same display screen, it is possible to reduce an erroneous operation. Especially, if the start key 53 and the reset key 54 are displayed separately on the corner areas at the lower right and the corner area at the lower left in the display screen, it is possible to reduce an erroneous operation when using the same hand.

Furthermore, the display region 520 has a size comparable to the display region 420 of each of the home screens 41 and 42, for example. However, the display region 520 may be the same size as the display region 420. Therefore, in an entire display region of the operating panel 20, the display region 420 and the display region 520 are provided in the same position in a comparable size or the same size. Accordingly, when overlapping each of the home screens 41 and 42 with the copy first screen 51, an area where the display region 420 and the display region 520 are overlapped (duplicated) with each other is larger than an area where those are not overlapped (duplicated) with each other.

Thus, the display region 520 where respective keys 53, 54, etc. are fixedly displayed is provided in the same position as the display region 420 where the button images 46a-46f are fixedly displayed, in the comparable or same size, and therefore, the respective home screens 41 and 42 and the copy first screen 51 (or the copy second screen 52) are similar to each other in an arrangement (layout) of displaying areas for displaying respective buttons or keys. Accordingly, it is possible to reduce as much as possible confusion of the user at the time of operation.

Like the copy first screen 51, in the copy second screen 52 shown in FIG. 4(B), a start key 53 is displayed in a corner area at the lower right, and a reset key 54 is displayed in a corner area at the lower left. That is, the start key 53 is displayed in a right end area of the display region 520, and the reset key 54 is displayed in a left end area of the display region 520. When transiting to a plurality of display screens as in the copy first screen 51 or the copy second screen 52, since the start key 53 and the reset key 54 are always displayed, the user can also perform promptly an operation start or suspension of setting of the image forming apparatus 10.

In contrast, as described above, the function selection images 55 are displayed on the display region 510. Although the number of functions capable of being selected is restricted by eight (8) pieces in the simple mode, respective buttons and characters are displayed in a large size, and it is devised so that the user can easily operate.

For example, in the copy first screen 51, four (4) function buttons of a sheet selection button 55a, a double-sided copy button 55b, a magnification button 55c and a staple button 55d are provided above the start key 53 and the reset key 54 over to a right end from a left end of the display region 510. In the second screen 52 of a copy, four (4) function buttons of a color mode button 55e, an image orientation button 55f, a copying density button 55g and a page aggregation button 55h are provided in the same position as the copy first screen 51. Thus, the function selection images 55 can be displayed over to the right end from the left end of the display region 510, and therefore, it is possible to display many functions.

Furthermore, because the display region 500 has a size the same or comparable to the system region 400, the display region 410 and the display region 510 also have the same or comparable size. Therefore, since the display region 520 where the function selection images 55 are switchably displayed is provided in the same position of the display region 410 where the menu images 44 are switchably displayed, in the same or comparable size, the respective home screens 41 and 42 and the copy first screen 51 (or the copy second screen 52) are similar to each other in an arrangement (layout) of displaying areas for displaying movable images. Furthermore, since the number of the function selection images 55 displayed at once is the same as the number of the menu images 44 displayed at once and the images 44 and 55 are aligned in the lateral direction, the arrangements of the images within the display region 410 and the display region 520 are also similar to each other. Also according to these points, it is possible to reduce as much as possible confusion of the user at the time of operation.

However, in the simple copy mode that the number of selectable functions is restricted, it is impossible to select items such as sorting/grouping, binding margin, cover/interleaving sheet, etc. The item that cannot be selected in the simple copy mode may be selected after transition to the normal copy mode by selecting the copy button 44e in the home second screen 42 shown in FIG. 3(B), or selecting a detail button shown in the upper right in the copy first screen 51 or the copy second screen 52 in FIGS. 4(A) and 4(B).

Then, when selecting the sheet selection button 55a in the copy first screen 51 shown in FIG. 4(A), for example, a sheet selection screen of the simple copy mode is displayed.

Figure 5:
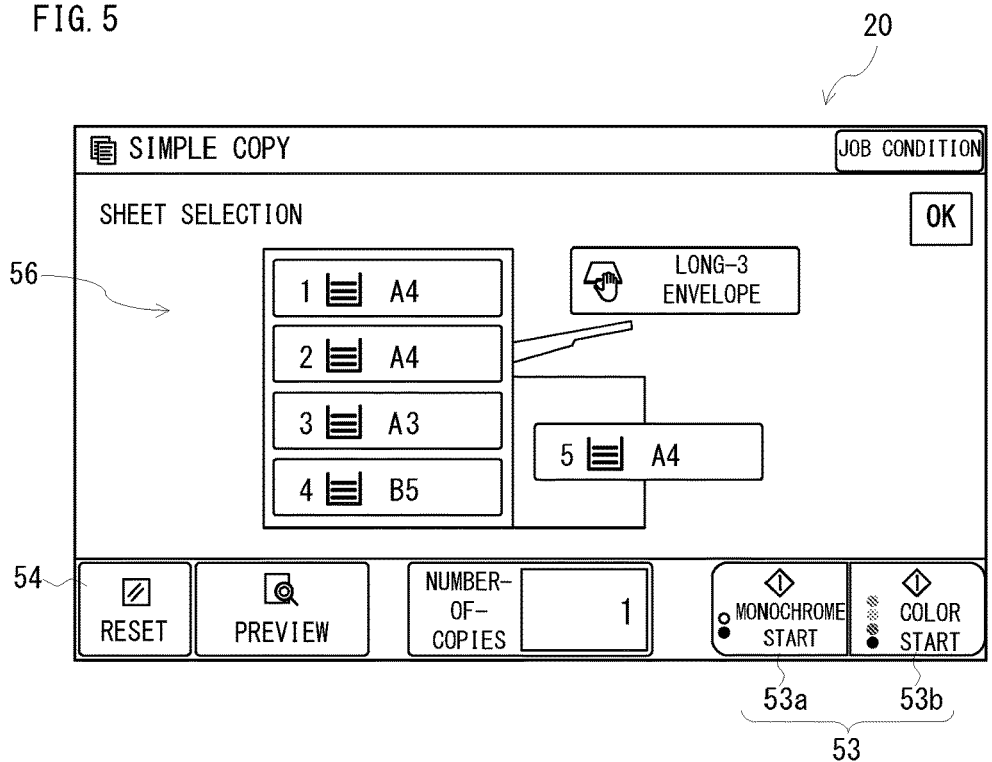
FIG. 5 is an explanatory view showing a sheet selection screen of the simple copy mode.

FIG. 5 is an explanatory view of the sheet selection screen in the simple copy mode, and in the sheet selection screen 56, selectable trays and kinds of sheets therein are displayed other than a tray currently selected and a kind of a sheet therein.

Here, a start key 53 of a shape of a laterally elongated rectangular is displayed in a corner area at the lower right of the sheet selection screen 56. That is, this start key 53 is displayed in the same lower right corner area in the same shape and the same size as those of the start key displayed in the copy first screen 51 or the copy second screen 52 explained with FIGS. 4(A) and 4(B). Furthermore, a reset key 54 is displayed in a corner area at the lower left of the sheet selection screen 56, and this reset key 54 is also displayed in the same lower left corner area in the same shape and the same size as those of the reset key displayed on the copy first screen 51 or the copy second screen 52. Thus, the start key and the reset key change neither a position, a size nor shape, they contribute to reduction of erroneous operation, speeding up of the operation start and suspension of setting in the image forming apparatus 10.

Furthermore, since the start key 53 and the reset key 54 are always displayed also when transiting to a plurality of display screens such as the sheet selection screen 56 shown in FIG. 5 from the copy first screen 51 shown in FIG. 4(A), this point also contributes to speeding up of an operation start or suspension of setting of an image forming apparatus 10.

Figure 6:
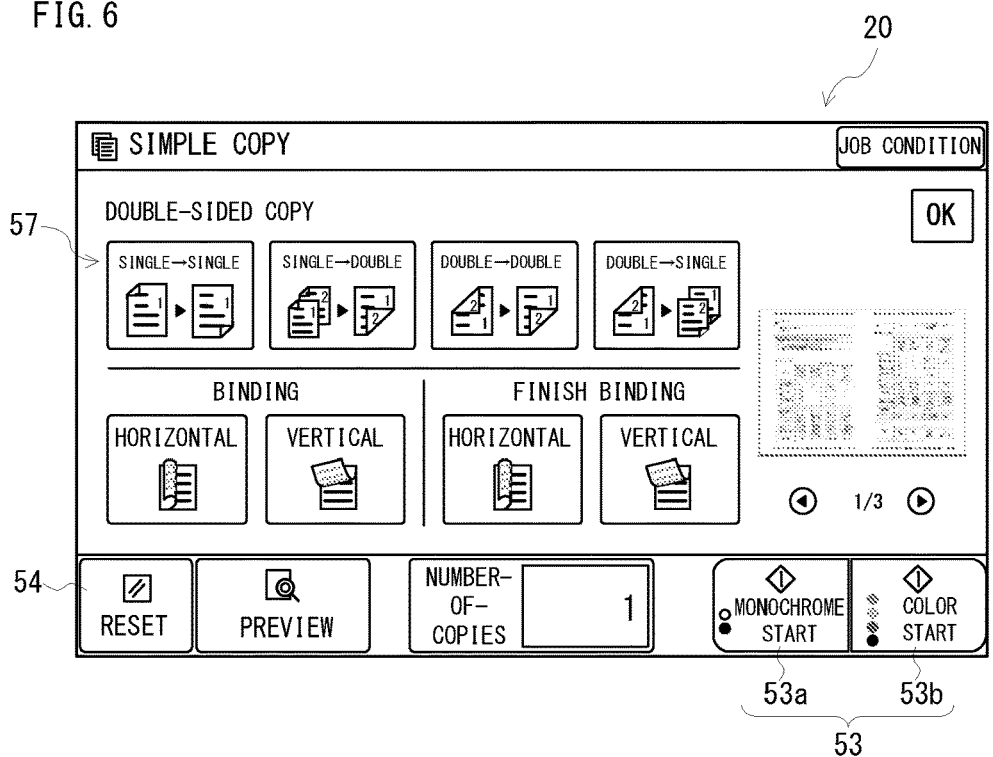
FIG. 6 is an explanatory view showing a double-sided copy screen of the simple copy mode.

FIG. 6 is an explanatory view of a double-sided copy screen in the simple copy mode, and when selecting the double-sided copy button 55b in the copy first screen 51 shown in FIG. 4(A), a double-sided copy screen 57 of the simple copy mode is displayed. In the double-sided copy screen 57, a kind of selectable double-sided copy and a binding method are displayed. Furthermore, if selecting a preview button of the double-sided copy screen 57, since a preview image is displayed in the right end of the double-sided copy screen 57, the user can select the kind of double-sided copy and the binding method while viewing the preview image.

Here, a start key 53 that is the same or similar to that in the sheet selection screen 56 shown in FIG. 5 is displayed on a corner area at the lower right of the double-sided copy screen 57, and a reset key 54 that is the same or similar to that in the sheet selection screen 56 is displayed on a corner area at the lower left of the double-sided copy screen 57.

Figure 7:
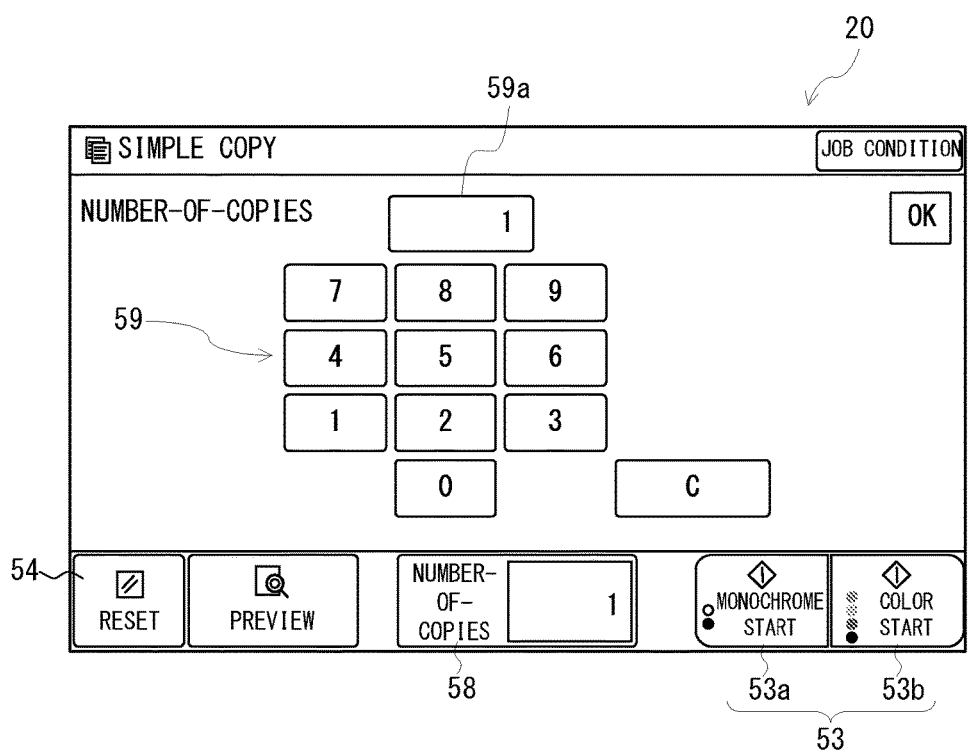
FIG. 7 is an explanatory view showing a ten key screen of the simple copy mode.

FIG. 7 is an explanatory view a ten key screen in the simple copy mode. A number-of-copies display portion 58 is displayed at the center lower end, for example of the copy first screen 51 or the copy second screen 52 shown in FIGS. 4(A) and 4(B). If the user taps the number-of-copies display portion 58, as shown in FIG. 7, a ten key 59 for inputting the number-of-processing of the image forming is displayed in the center of the display screen, and a ten key input display portion 59a is also displayed above the ten key 59. When inputting with the ten key 59 and selecting an OK button shown in the upper right of this screen, the number-of-copies display portion 58 and the ten key 59, for example are non-displayed, and only the ten key input display portion 59a is displayed. Accordingly, when inputting with the ten key 59, even if the number-of-copies display portion 58 is hidden by a wrist, for example, since the ten key input display portion 59a is formed above the ten key 59 and thus it becomes difficult to be hidden by a hand, confirmation of an input result with the ten key 59 becomes easy.

As described above, according to the above-described embodiment, if the simple copy mode is selected, the display control portion 30 explained with FIG. 1 displays the copy first screen 51 in FIG. 4(A). When the user wants to copy after selecting a suitable sheet, if selecting the sheet selection button 55a in the copy first screen 51, for example, the sheet selection screen 56 of the simple copy mode of FIG. 5 is made to be displayed, the start key 53 and the reset key 54 are both displayed in also the sheet selection screen 56 separately from each other. Then, when the setting concerning with the sheet is completed in the sheet selection screen 56, if operating the start key 53 being displayed in the sheet selection screen 56, the copy is started. Therefore, other function buttons, a ten key, etc. that are displayed in the normal mode do not come into view and thus are not conscious until the copy start from the setting of the sheet, whereby the copy can be completed on a single screen of the sheet selection screen 56.

Although the above-described embodiment explained by exemplifying the simple copy mode, it does not need to be limited to this embodiment. In also a case of the simple fax mode or the simple scan mode, for example, it is possible to expect an advantageous effect the same or similar to that in the simple copy mode.

In addition, although the above-described embodiment is explained a case where the start key 53 is displayed on the corner area at the lower right of the operating panel 20 and the reset key 54 is displayed on the corner area at the lower left of the operating panel 20 in the copy first screen 51 and the copy second screen 52, it does not need to be limited to this. The reset key 54 may be displayed on a corner area of the upper left or the upper right of the operating panel 20, for example. Furthermore, positions where the start key 53 and the reset key 54 are displayed may be replaced with each other. That is, the start key 53 is displayed in any one of the corner areas (corner portions) of the operating panel 20, and the reset key 54 is displayed in another one of the corner areas. These are the same also about a start key 63 and a reset key 64, and about a start key 73 and a reset key 74, described later.

Second Embodiment

Figure 8A:
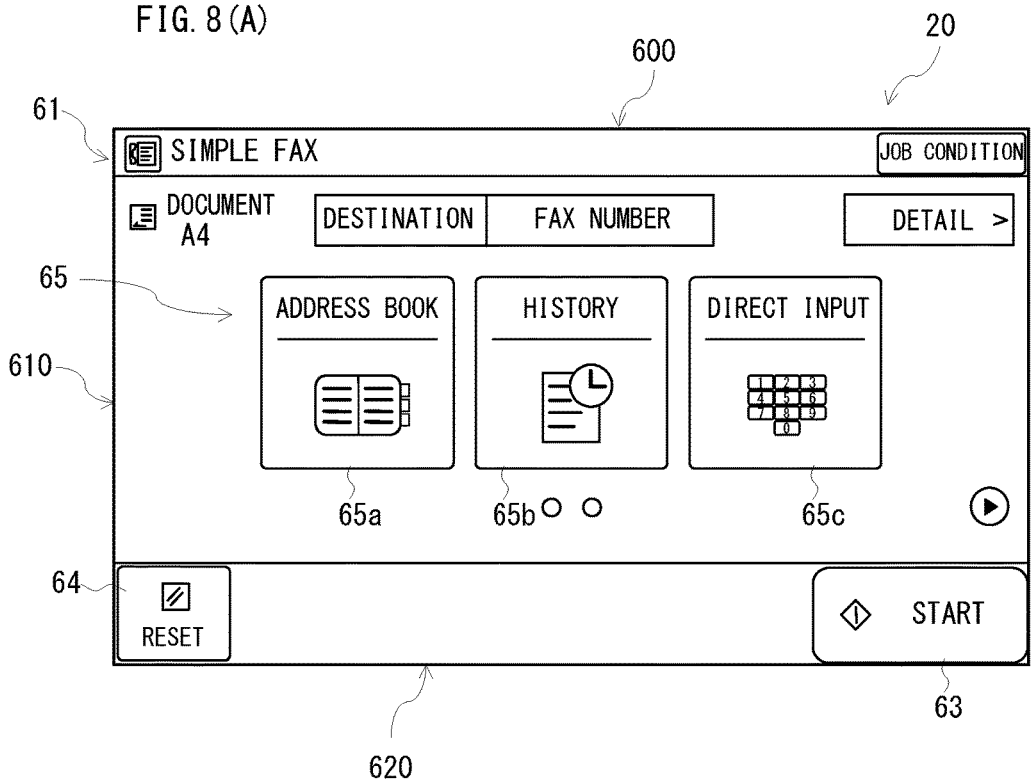
FIGS. 8(A) and 8(B) are explanatory views showing a basic screen of a simple fax mode.
Figure 8B:
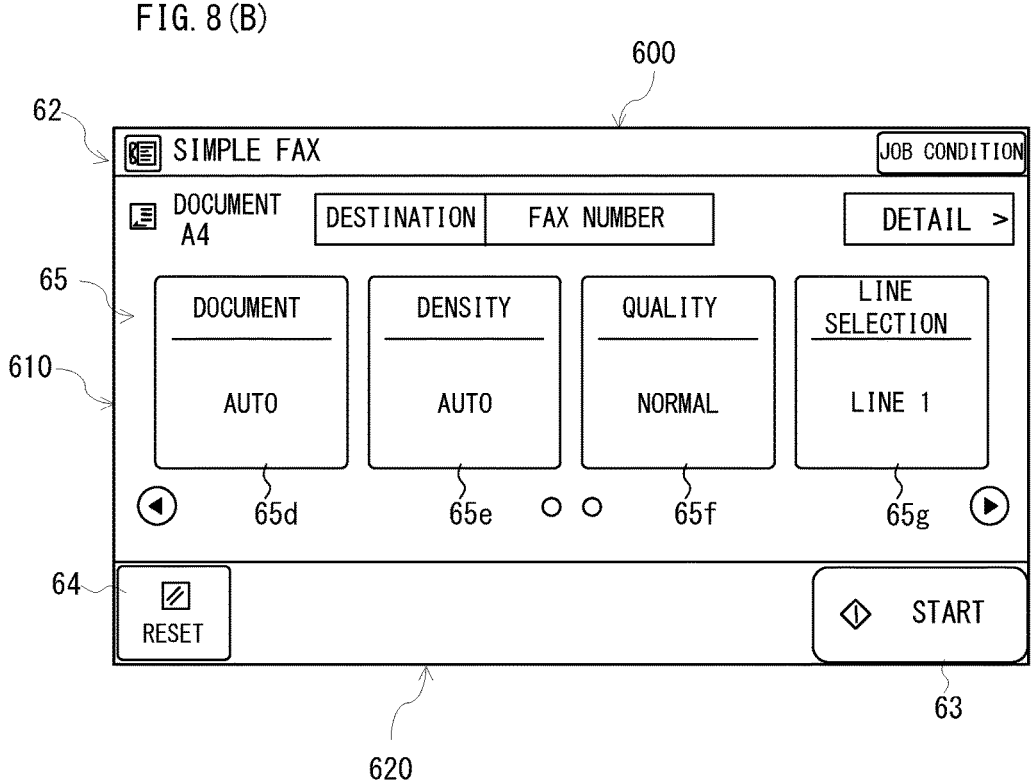

FIGS. 8(A) and 8(B) are explanatory views of a basic screen of the simple fax mode.

If selecting the simple fax button 43b or the simple fax button 44b shown in FIGS. 3(A) and 3(B), a fax first screen 61 shown in FIG. 8(A) is displayed, and it is possible to transit from the fax first screen 61 to a fax second screen 62 shown in FIG. 8(B) by a flick operation etc. Each of the fax first screen 61 and the fax second screen 62 is a screen for setting operation conditions in a case where the operation mode is the simple fax mode, such as selection of destination with an address book, display of a history, direct input, setting of document size, setting of reading density of document, setting of image quality, line selection, etc.

In the fax first screen 61, a display region 600 for indicating that the operation mode is the simple fax mode is provided in an upper end portion, and a display region 610 for displaying function selection images 65 is provided below this display region 600. Furthermore, a display region 620 for displaying a start key 63 and a reset key 64 is provided below this display region 610 in a lower end portion of the fax first screen 61. The display regions 600, 610 and 620 have a shape of a laterally elongated rectangular, respectively.

The start key 63 is displayed in a corner area at the lower right of the fax first screen 61, for example. That is, the start key 63 is displayed in a right end area of the display region 620. The start key 63 is provided in a shape of a laterally elongated rectangular.

On the other hand, the reset key 64 is displayed on a corner area at the lower left of the fax first screen 61, for example. That is, the reset key 64 is displayed on a left end area of the display region 620. Although the reset key 64 is provided in a shape of a laterally elongated rectangular, it is provided in size smaller than the start key 63.

In also a fax second screen 62 shown in FIG. 8(B), like the fax first screen 61, a start key 63 is displayed in a corner area at the lower right and a reset key 64 is displayed in a corner area at the lower left.

In contrast, only function selection images 65 are displayed in a remaining area except the start key 63 and the reset key 64.

For example, three (3) function buttons of an address book button 65a, a history button 65b and a direct input button 65c are provided in the fax first screen 61 above the start key 63 and the reset key 64 over to a right end from a left end of the display region 610. In the fax second screen 62, four (4) function buttons of a document button 65d, a density button 65e, an image quality button 65f and a line selection button 65g are provided in the same or similar positions as in the fax first screen 61.

Since a display region 620 where the function selection images 65 are switchably displayed is provided in the fax screens 61 and 62 in the same position of the display region 410 where the menu images 44 are switchably displayed, in the same or comparable size, an arrangement (layout) of displaying areas of movable images is similar to that of the respective home screens 41 and 42. Furthermore, since the number of the function selection images 65 is the same as the number of the menu images 44 displayed at once and the images 44 and 65 are aligned in the lateral direction, arrangements of the images within the display region 410 and the display region 620 are also similar to each other. In addition, in the fax first screen 61 shown in FIG. 8(A), the number of the function selection images 65 is less than the number of the menu images 44.

Furthermore, the display region 620 where respective keys 63 and 64 etc. are fixedly displayed is provided in the same position of the display region 420 where the button images 46a-46f are fixedly displayed, in the comparable or same size, and therefore, the respective home screens 41 and 42 and the fax screens 61 and 62 are similar to each other in an arrangement (layout) of displaying areas for displaying respective buttons or keys.

Accordingly, also when the simple fax mode is selected as an operation mode, it is possible to reduce as much as possible confusion of the user at the time of operation.

However, in the simple fax mode that the number of selectable functions is restricted, it is impossible to select items such as mass document mode, the number of documents count, time designation, etc., for example. The item that cannot be selected in the simple fax mode may be selected after transition to the normal fax mode by selecting the fax button 44f of the home second screen 42 shown in FIG. 3(B), or selecting a detail button shown in the upper right in the fax first screen 61 or the fax second screen 62 in FIGS. 8(A) and 8(B).

Then, when selecting the address book button 65a, for example in the fax first screen 61 shown in FIG. 8(A), an address book screen of the simple fax mode is displayed.

Figure 9:
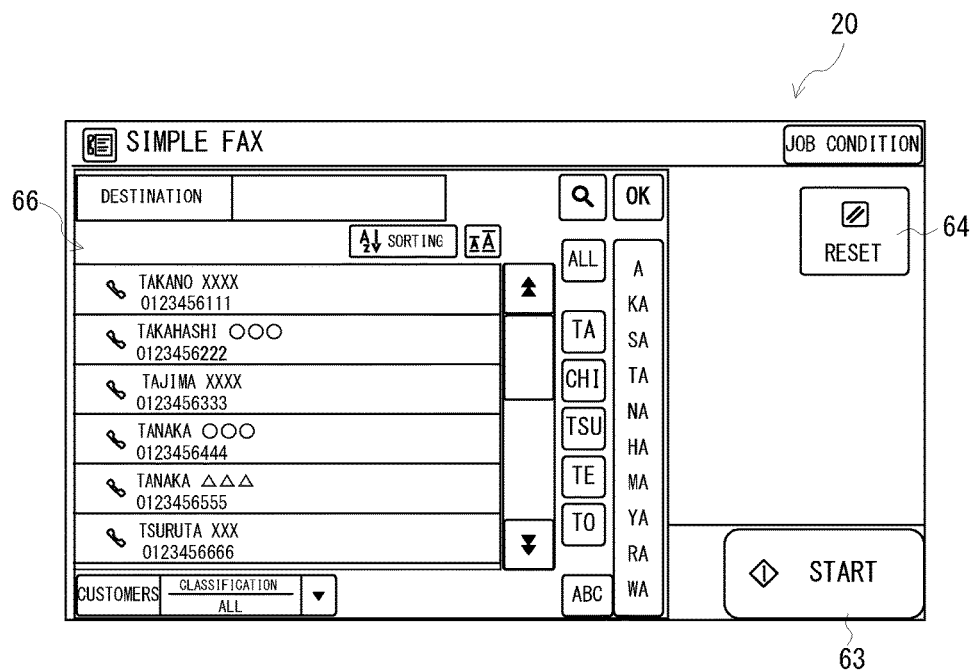
FIG. 9 is an explanatory view showing an address book screen of the simple fax mode.

FIG. 9 is an explanatory view of the address book screen of the simple fax mode, and when selecting the address book button 65a in the fax first screen 61 shown in FIG. 8(A), the address book screen 66 of the simple fax mode is displayed. Destination addresses and fax numbers that can be selected at the present are displayed on the address book screen 66 over to a left end from a center of the display screen, and can be scrolled in an up-and-down direction.

Here, the start key 63 of a shape of a laterally elongated rectangular is shown in a corner area at the lower right of the address book screen 66. That is, this start key 63 is displayed on the same lower right corner area in the same shape and the same size as those of the start key displayed on the fax first screen 61 or the fax second screen 62 explained with FIGS. 8(A) and 8(B). Then, when selection of a destination address is completed, the start key 63 becomes selectable.

On the other hand, the reset key 64 is displayed on a corner area at the upper right of the address book screen 66. That is, this reset key 64 is displayed in the same shape but in a corner area different from the reset key displayed on the fax first screen 61 or the fax second screen 62.

When displaying the destination addresses in the up-and-down direction in the display screen as in the fax mode, if the reset key is moved from the lower left of the display screen to be displayed in the upper right corner area, it is possible to ensure a displaying area of the destination addresses, and to reduce an erroneous operation, and to perform promptly an operation start and suspension of setting of the image forming apparatus 10.

In addition, in a case of a large display screen, a start key and a reset key can also be displayed in corner areas on a diagonal line, respectively.

Third Embodiment

Figure 10A:
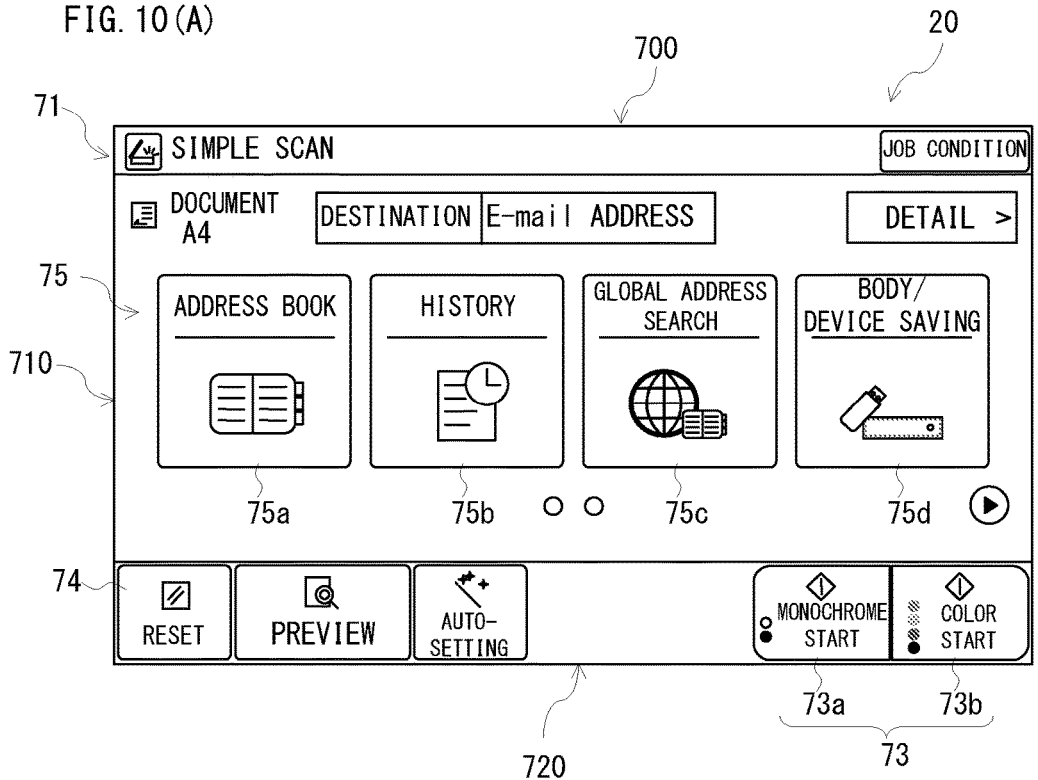
FIGS. 10(A) and 10 (B) are explanatory views showing a basic screen of a simple scan mode.
Figure 10B:
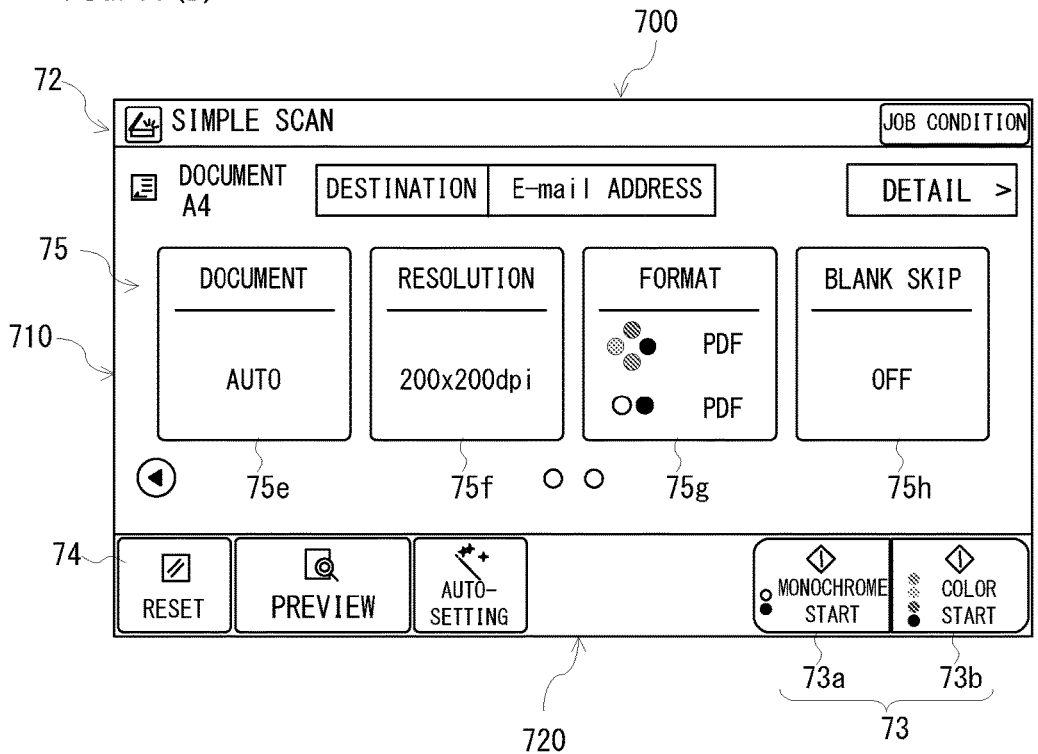

FIGS. 10(A) and 10(B) are explanatory views of a basic screen of the simple scan mode.

If selecting the simple scan button 43*c* or the simple scan button 44*c* shown in FIGS. 3(A) and 3(B), a scan first screen 71 shown in FIG. 10(A) is displayed, and it is possible to transit from the scan first screen 71 to a scan second screen 72 shown in FIG. 10(B) by a flick operation etc. Each of the scan first screen 71 and the scan second screen 72 is a screen for setting operation conditions in a case where the operation mode is the simple scan mode, such as selection of destination with an address book, display of a history, global address search, setting of saving destination, setting of document size, setting of reading resolution of document, setting of format, blank sheet skip function, etc.

In the scan first screen 71, a display region 700 for indicating that the operation mode is the simple scan mode is provided in an upper end portion, and a display region 710 for displaying function selection images 75 is provided below this display region 700. Furthermore, a display region 720 for displaying a start key 73 and a reset key 74 is provided below this display region 710 in a lower end portion of the scan first screen 71. The display regions 700, 710 and 720 have a shape of a laterally elongated rectangular, respectively.

The start key 73 consisting of a monochrome start key 73*a* and a color start key 73*b* like the start key 53 explained with FIGS. 4(A) and 4(B) is displayed in a corner area at the lower right of the scan first screen 71. That is, the start key 73 is displayed in a right end area of the display region 720.

On the other hand, the reset key 74 the same as the reset key 54 explained with FIGS. 4(A) and 4(B) is displayed on a corner area at the lower left of the scan first screen 71. That is, the reset key 74 is displayed on a left end area of the display region 720.

In also a scan second screen 72 shown in FIG. 10(B), like the scan first screen 71, a start key 73 is displayed on a corner area at the lower right and a reset key 74 is displayed in a corner area at the lower left.

In contrast, only function selection images 75 are displayed in a remaining area except the start key 73 and the reset key 74.

For example, four (4) function buttons of an address book button 75*a*, a history button 75*b*, a global address search button 75*c* and a body/device saving button 75*c* are provided in the scan first screen 71 above the start key 73 and the reset key 74 over to a right end from a left end of the display region 710. In the scan second screen 72, four (4) function buttons of a document button 75*e*, a resolution button 75*f*, a format button 75*g* and a blank sheet skip button 75*h* are provided in the same position as the scan first screen 71.

Since a display region 720 where the function selection images 75 are switchably displayed is provided in the scan screens 71 and 72 in the same position of the display region 410 where the menu images 44 are switchably displayed, in the same or comparable size, an arrangement (layout) of displaying areas of movable images is similar to that of the respective home screens 41 and 42. Furthermore, since the number of the function selection images 75 is the same as the number of the menu images 44 displayed at once and the images 44 and 55 are aligned in the lateral direction, the arrangements of the images within the display region 410 and the display region 720 are also similar to each other.

Furthermore, the display region 720 where respective keys 73, 74 etc. are fixedly displayed is provided in the same position of the display region 420 where the button images 46*a*-46*f* are fixedly displayed, in the comparable or same size, and therefore, the respective home screens 41 and 42 and the scan screens 71 and 72 are similar to each other in an arrangement (layout) of displaying areas for displaying respective buttons or keys.

Accordingly, also when the simple scan mode is selected as an operation mode, it is possible to reduce as much as possible confusion of the user at the time of operation.

However, in the simple scan mode that the number of selectable functions is restricted, it is impossible to select items such as mass document mode, the number of documents count, book division, etc., for example. The item that cannot be selected in the simple scan mode may be selected after transition to the normal scan mode by selecting the E-Mail button 44*g* or the shared folder button 44*h* of the home second screen 42 shown in FIG. 3(B) to select image transmission, or selecting a detail button shown in the upper right in the scan first screen 71 or the scan second screen 72 in FIGS. 10(A) and 10(B).

Then, when selecting the history button 75*b*, for example in the scan first screen 71 shown in FIG. 10(A), a history screen of the simple scan mode is displayed.

Figure 11:
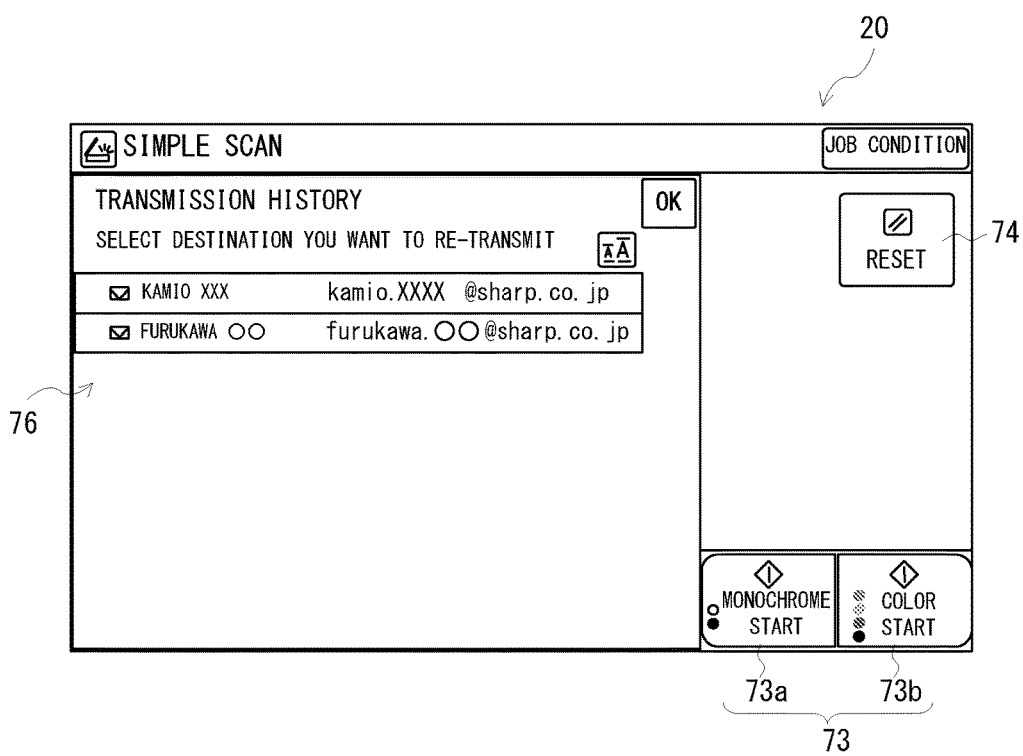
FIG. 11 is an explanatory view showing a history screen of the simple scan mode.

FIG. 11 is an explanatory view of the history screen in the simple scan mode, and currently re-transmittable destinations and addresses are displayed on the history screen 76 over to a left end from the center of the display screen. In addition, if the number of histories increases, a scroll in the up-and-down direction becomes possible.

Here, the start key 73 of a shape of a laterally elongated rectangular is shown in a corner area at the lower right of the history screen 76. That is, this start key 73 is displayed on the same lower right corner area in the same shape and the same size as those of the start key displayed on the scan first screen 71 or the scan second screen 72 explained with FIGS. 10(A) and 10(B).

On the other hand, the reset key 74 is displayed on a corner area at the upper right of the history screen 76. That is, this reset key 74 is displayed in the same shape but in a corner area different from the reset key displayed on the scan first screen 71 or the scan second screen 72.

When displaying the history in the up-and-down direction in the display screen like the scan mode, if the reset key is moved from the lower left of the display screen to be displayed in the upper right corner area, it is possible to ensure a displaying area of the history, and to reduce an erroneous operation, and to perform promptly an operation start and suspension of setting of the image forming apparatus 10.

Fourth Embodiment

Figure 12:
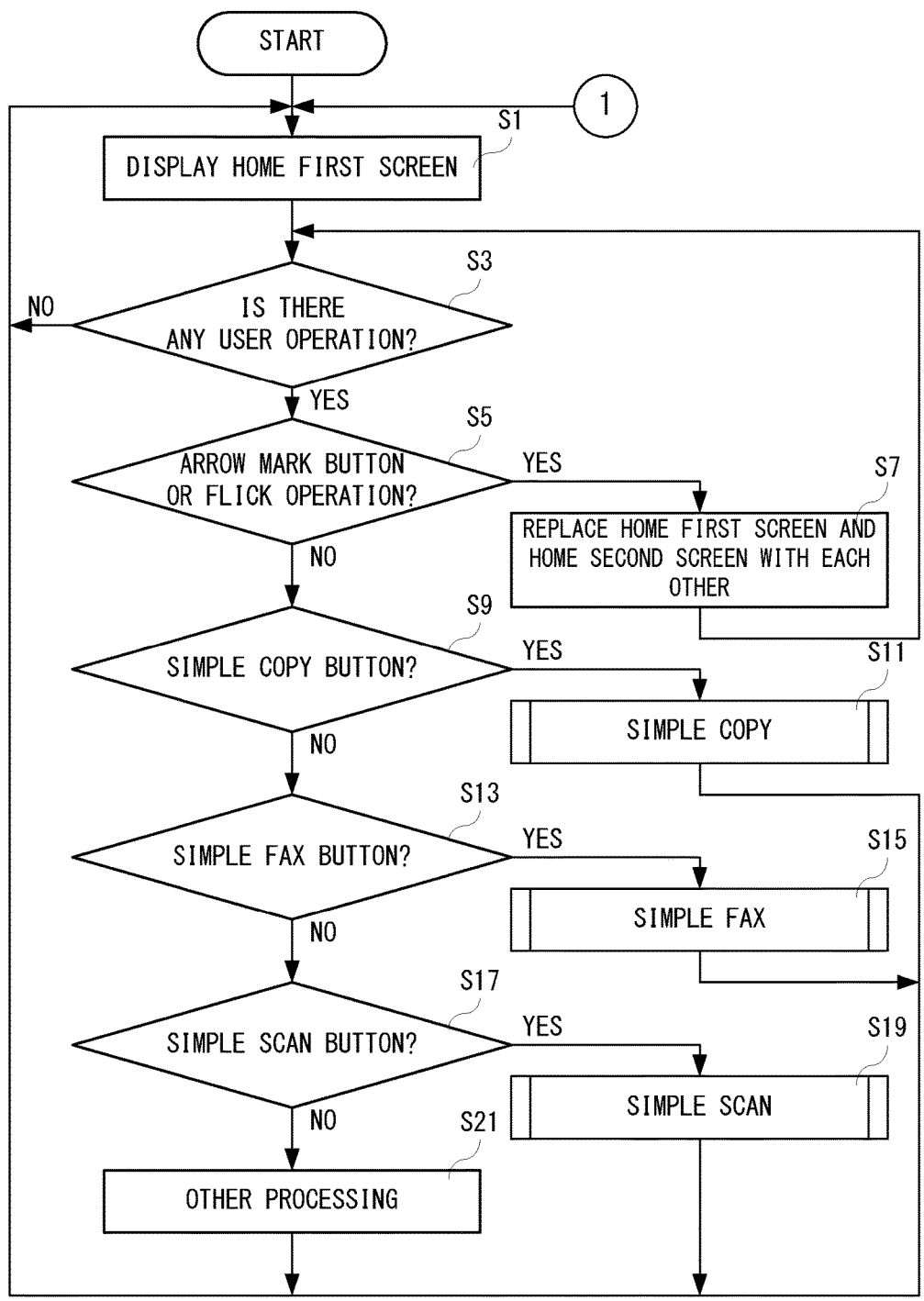
FIG. 12 is a flowchart showing control processing by a control portion.
Figure 13:
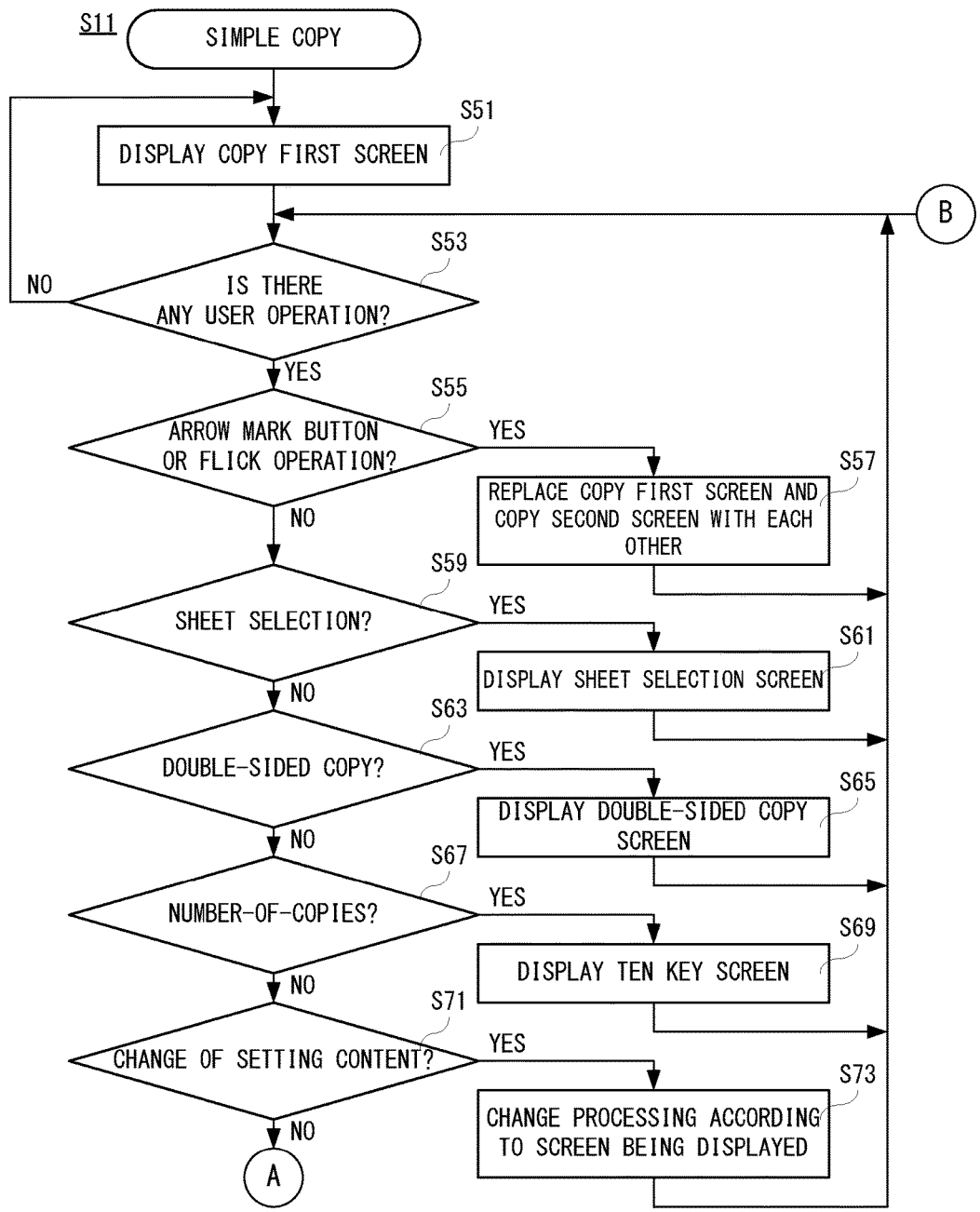
FIG. 13 is a flowchart showing a part of simple copy processing by the control portion.
Figure 14:
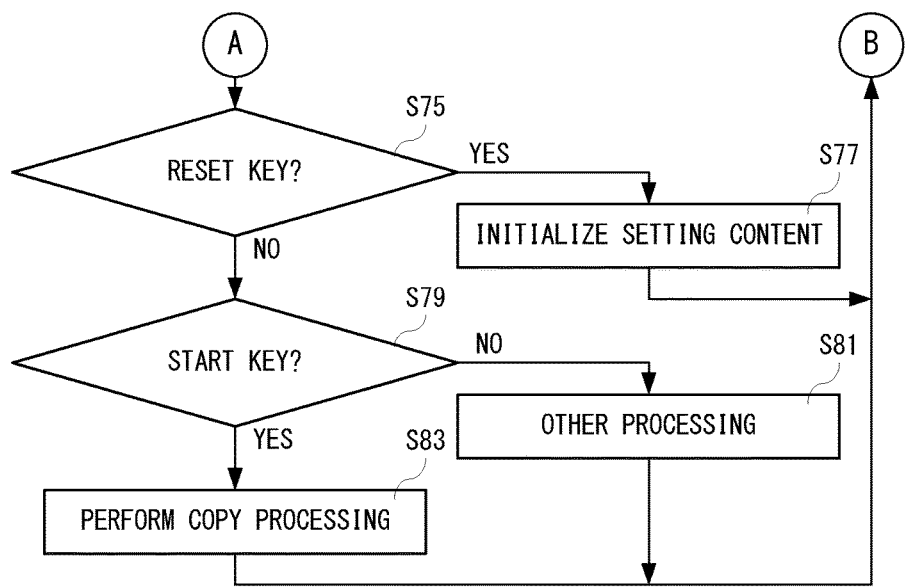
FIG. 14 is another part of the simple copy processing by the control portion, and is a flowchart following FIG. 13.
Figure 15:
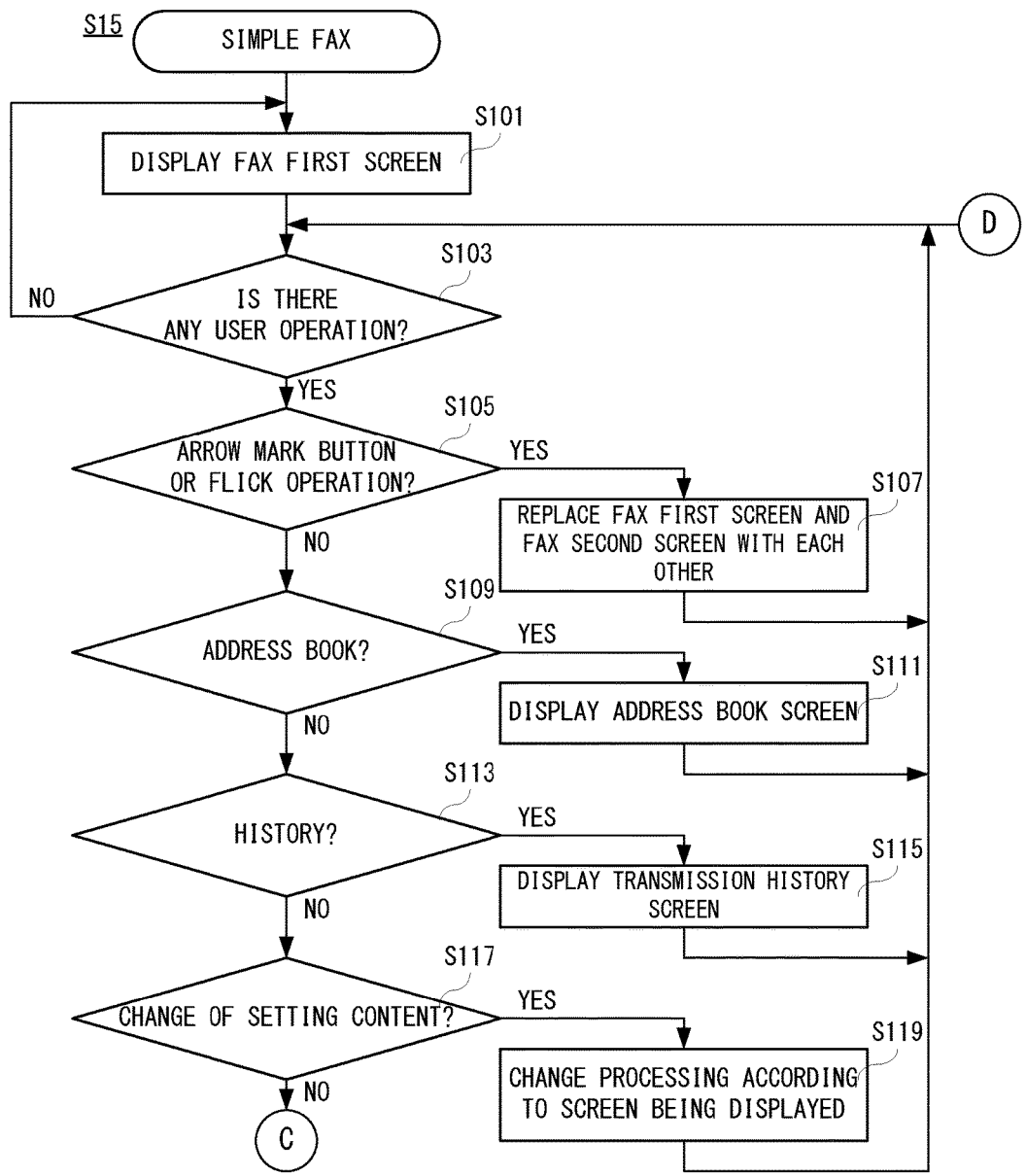
FIG. 15 is a flowchart showing a part of simple fax processing by the control portion.
Figure 16:
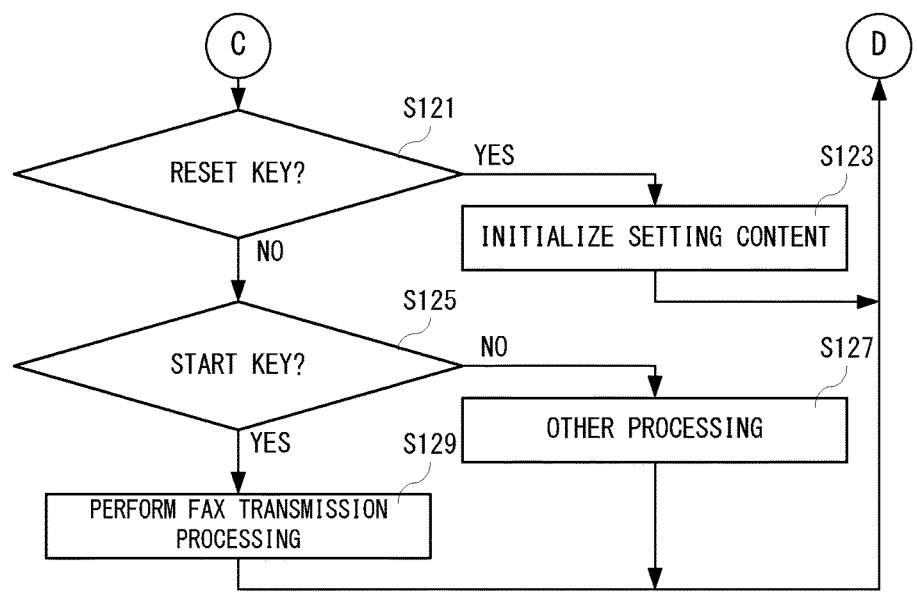
FIG. 16 is another part of the simple fax processing by the control portion, and is a flowchart following FIG. 15.
Figure 17:
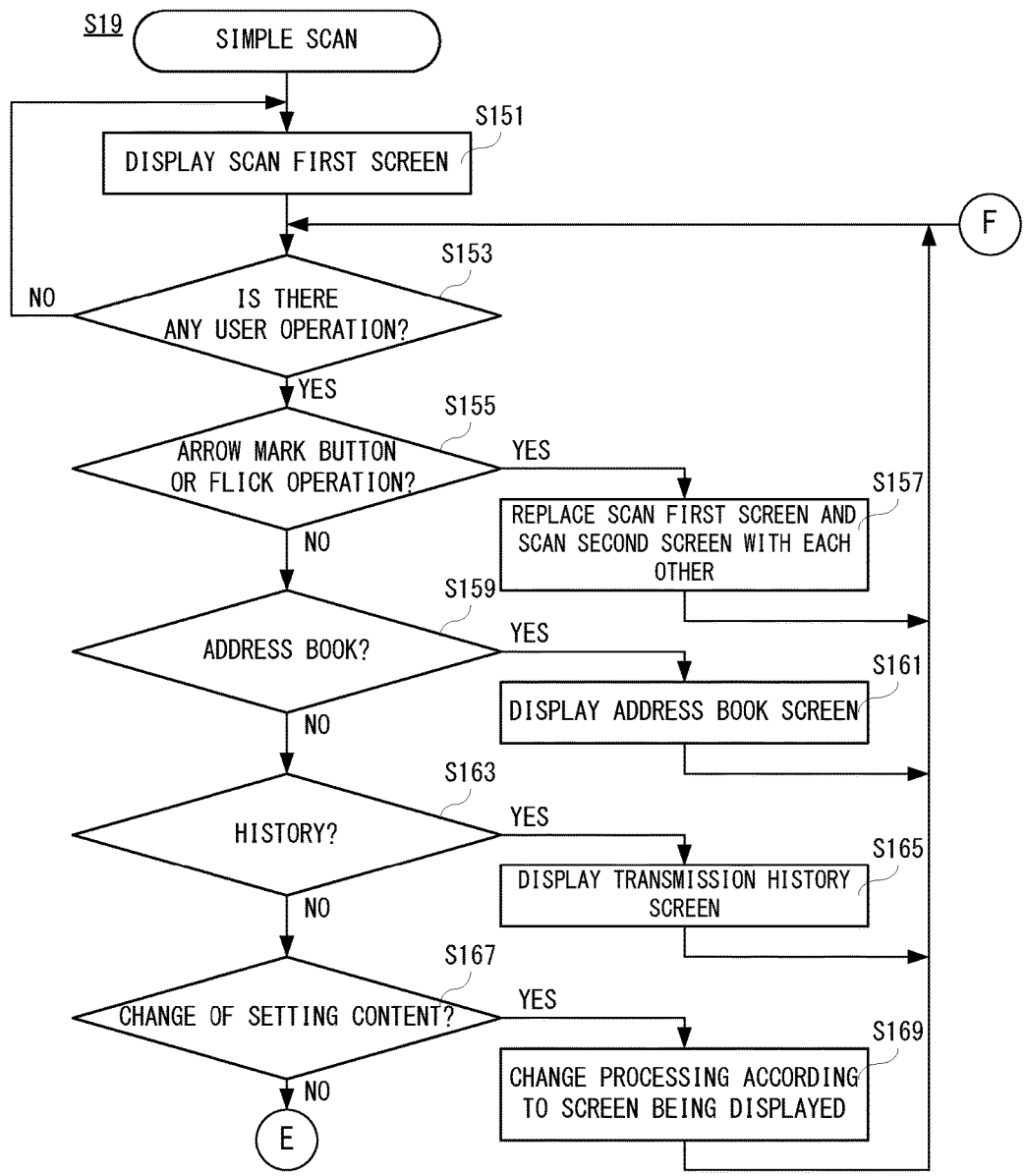
FIG. 17 is a flowchart showing a part of simple scan processing by the control portion.
Figure 18:
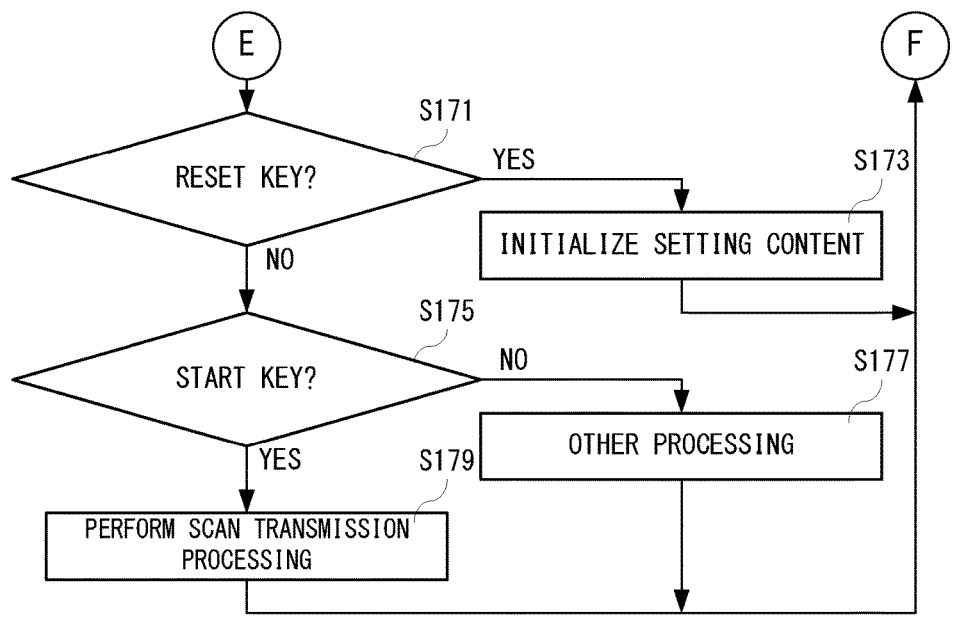
FIG. 18 is another part of the simple scan processing by the control portion, and is a flowchart following FIG. 17.

In the fourth embodiment, selection of each operation mode and processing of the control portion 17 in the selected operation mode will be described specifically. FIG. 12 is a flowchart showing an example of control processing for controlling an overall operation of the image forming apparatus 10 by the control portion 17. FIG. 13 and FIG. 14 are flowcharts showing an example of simple copy processing by the control portion 17. FIG. 15 and FIG. 16 are flowcharts showing an example of simple fax processing by the control portion 17. FIG. 17 and FIG. 18 are flowcharts showing an example of simple scan processing by the control portion 17.

If a power supply of the image forming apparatus 10 is turned on or the image forming apparatus 10 is shifted to the normal mode from a power-saving mode, as shown in FIG. 12, the control portion 17 starts the control processing, and displays the home first screen 41 as shown in FIG. 3(A) on the operating panel 20 in a step S1.

In a next step S3, it is determined whether there is any user operation. Here, the control portion 17 determines whether coordinate data is input from the touch panel 21 constituting the operating panel 20. The control portion 17 further determines whether operation data is input from the hardware key 23. If "NO" is determined in the step S3, that is, if there is no user operation, the process returns to the step S1. On the other hand, if "YES" is determined in the step S3, that is, if there is a user operation, it is determined, in a step S5, whether a tap operation to the arrow mark button 45 is performed, or whether a flick operation is performed.

Here, the control portion 17 determines whether a tap operation to the arrow mark button 45 is performed by determining whether the coordinate data that is input from the touch panel 21 is included within a displaying area of the arrow mark button 45. In the following, the same also applies when determining whether a tap operation to other buttons or keys that are displayed on the operating panel 20 is performed, and whether a tap operation to the displaying area or portion is performed (designation or selection is performed). Furthermore, the control portion 17 determines whether a flick operation is performed by determining whether a touch position indicated by the coordinate data is changed more than a predetermined distance within a predetermined time period. In the following, the same applies.

If "YES" is determined in the step S5, that is, if a tap operation to the arrow mark button 45 is performed or a flick operation is performed, the home first screen 41 and the home second screen 42 as shown in FIG. 3(B) are replaced with each other in a step S7. That is, in the step S7, if the home first screen 41 is being displayed on the operating panel 20, it is replaced with the home second screen 42, and if the home second screen 42 is being displayed on the operating panel 20, it is changed to the home first screen 41. The same applies when changing the copy first screen 51 and the copy second screen 52, changing the fax first screen 61 and the fax second screen 62, and when changing the scan first screen 71 and the scan second screen 72, as described later.

On the other hand, if "NO" is determined in the step S5, that is, if a tap operation to the arrow mark button 45 is not performed and no flick operation is performed, it is determined, in a step S9, whether a tap operation to either the simple copy buttons 43a or 44a is performed.

If "YES" is determined in the step S9, that is, if a tap operation to either the simple copy buttons 43a or 44a is performed, the process returns to the step S1 after performing in a step S11 the simple copy processing (see FIG. 13 and FIG. 14) described later. On the other hand, if "NO" is determined in the step S9, that is, if no tap operation to both the simple copy buttons 43a and 44a is performed, it is determined, in a step S13, whether a tap operation to either the simple fax buttons 43b or 44b is performed.

If "YES" is determined in the step S13, that is, if a tap operation to either the simple fax buttons 43b or 44b is performed, the process returns to the step S1 after performing in a step S15 the simple fax processing (see FIG. 15 and FIG. 16) described later. On the other hand, if "NO" is determined in the step S13, that is, if no tap operation to both the simple fax buttons 43b and 44b is performed, it is determined, in a step S17, whether a tap operation to either the simple scan buttons 43c or 44c is performed.

If "YES" is determined in the step S17, that is, if a tap operation to either the simple scan buttons 43c or 44c is performed, the process returns to the step S1 after performing in a step S19 the simple scan processing (see FIG. 17 and FIG. 18) described later. On the other hand, if "NO" is determined in the step S17, that is, if no tap operation to both the simple scan buttons 43c and 44c is performed, the process returns to the step S1 after performing in a step S21 other processing. As the other processing, for example, processing according to other buttons or keys displayed on the home first screen 41 or the home second screen 42 is performed.

In addition, when the home button of the hardware key 23 is operated in the simple copy processing, the simple fax processing or the simple scan processing, interruption processing is performed so that each processing is forcedly terminated, and the process returns to the step S1.

FIG. 13 and FIG. 14 are flowcharts showing an example of the simple copy processing in the step S11 shown in FIG. 12. In the following, although the simple copy processing will be described, the same processing or similar processing as the already explained processing will be described simply. If the simple copy processing is started as shown in FIG. 13, the copy first screen 51 as shown in FIG. 4(A) is displayed on the operating panel 20 in a step S51. In a next step S53, it is determined whether there is any user operation. If "NO" is determined in the step S53, the process returns to the step S51.

On the other hand, if "YES" is determined in the step S53, it is determined, in a step S55, whether a tap operation to the arrow mark button 45 is performed, or a flick operation is performed. If "YES" is determined in the step S55, the copy first screen 51 and the copy second screen 52 as shown in FIG. 4(B) are replaced with each other in a step S57.

On the other hand, if "NO" is determined in the step S55, it is determined, in a step S59, whether a tap operation to the sheet selection button 55a is performed. If "YES" is determined in the step S59, that is, if a tap operation to the sheet selection button 55a is performed, the sheet selection screen 56 as shown in FIG. 5 is displayed on the operating panel 20 in a step S61, and the process returns to the step S53. On the other hand, if "NO" is determined in the step S59, that is, if a tap operation to the sheet selection button 55a is not performed, it is determined, in a step S63, whether a tap operation to the double-sided copy button 55b is performed.

If "YES" is determined in the step S63, that is, if a tap operation to the double-sided copy button 55b is performed, the double-sided copy screen 57 as shown in FIG. 6 is displayed on the operating panel 20 in a step S65, and the process returns to the step S53. On the other hand, if "NO" is determined in the step S63, that is, if a tap operation to the double-sided copy button 55b is not performed, it is determined, in a step S67, whether a tap operation to the number-of-copies display portion 58 is performed.

If "YES" is determined in the step S67, that is, if the number-of-copies display portion 58 is tapped, a ten key screen (the ten key 59 and the ten key input display portion 59*a*) is displayed on the operating panel 20 in a step S69, and the process returns to the step S53. On the other hand, if "NO" is determined in the step S67, it is determined, in a step S71, whether the setting content is to be changed. Specifically, when the sheet selection screen 56 is being displayed on the operating panel 20, it is determined whether a kind of a tray or a sheet is selected (changed) as the setting content. Furthermore, when the double-sided copy screen 57 is being displayed on the operating panel 20, a kind of the double-sided copy or a binding method is selected (changed) as the setting content. Furthermore, when the ten key screen is being displayed on the operating panel 20, as the setting content, it is determined whether the number-of-processing is input (changed) with the ten key 59, or whether the number-of-processing is settled by performing a tap operation to the OK button.

If "YES" is determined in the step S71, that is, if the setting content is to be changed, change processing of the setting content according to a screen that is being displayed is performed in a step S73, and the process returns to step S53. On the other hand, if "NO" is determined in the step S71, that is, not change of the setting content, it is determined, in a step S75 shown in FIG. 14, whether a tap operation to the reset key 54 is performed. If "YES" is determined in the step S75, that is, if a tap operation to the reset key 54 is performed, the setting content is initialized in a step S77, and the process returns to the step S53 shown in FIG. 13. On the other hand, if "NO" is determined in the step S75, that is, if a tap operation to the reset key 54 is not performed, it is determined, in a step S79, whether a tap operation to the start key 53 is performed.

If "NO" is determined in the step S79, that is, a tap operation to the start key 53 is not performed, the process returns to the step S53 after performing other processing in a step S81. Although detailed description is omitted, as the other processing, display of magnification selection screen, selection of magnification, on/off of staple function, display of color mode setting screen, setting color mode, display of image orientation selection screen, setting of image orientation, display of copying density setting screen, setting of copying density, display of aggregation (N-in-1) selection screen, selection aggregation (N-in-1), etc. corresponds. Furthermore, when operating the home button, the control portion 17 forcedly terminates the simple copy processing, and returns to the step S1 shown in FIG. 12 by interruption. This is true also about the simple fax processing and the simple scan processing described later.

On the other hand, if "YES" is determined in the step S79, that is, if a tap operation to the start key 53 is performed, the process returns to the step 53 after performing the copy processing in a step S83. In addition, in the step S83, when a tap operation to the monochrome start key 53*a* is performed, a printing job in monochrome is performed, and when a tap operation to the color start key 53*b* is performed, a printing job in color is performed.

FIG. 15 and FIG. 16 are flowcharts showing an example of the simple fax processing in the step S15 shown in FIG. 12. In the following, although the simple fax processing will be described, the same processing or similar processing as the already explained processing will be described simply. If the simple fax processing is started as shown in FIG. 15, the fax first screen 61 as shown in FIG. 8(A) is displayed on the operating panel 20 in a step S101. In a next step S103, it is determined whether there is any user operation. If "NO" is determined in the step S103, the process returns to the step S101.

On the other hand, if "YES" is determined in the step S1, it is determined, in a step S105, whether a tap operation to the arrow mark button 45 is performed, or whether a flick operation is performed. If "YES" is determined in the step S105, the fax first screen 61 and the fax second screen 62 as shown in FIG. 8(B) are replaced with each other in a step S107.

On the other hand, if "NO" is determined in the step S105, it is determined, in a step S109, whether a tap operation to the address book button 65*a* is performed. If "YES" is determined in the step S109, that is, if a tap operation to the address book button 65*a* is performed, the address book screen 66 as shown in FIG. 9 is displayed on the operating panel 20 in a step S111, and the process returns to the step S103. On the other hand, if "NO" is determined in the step S109, that is, if a tap operation to the address book button 65*a* is not performed, it is determined, in a step S113, whether a tap operation to the history button 65*b* is performed.

If "YES" is determined in the step S113, that is, if a tap operation to the history button 65*b* is performed, the history screen of the simple fax mode is displayed on the operating panel 20 in a step S115, and the process returns to the step S103. On the other hand, if "NO" is determined in the step S113, it is determined, in a step S117, whether the setting content is to be changed. Specifically, when the address book screen 66 is being displayed on the operating panel 20, it is determined whether sorting is selected (changed) as the setting content. Furthermore, when the history screen is being displayed on the operating panel 20, it is determined whether the destination address to be re-transmitted is selected as the setting content.

If "YES" is determined in the step S117, that is, if the setting content is to be changed, change processing of the setting content according to a screen that is being displayed is performed in a step S119, and the process returns to step S103. On the other hand, if "NO" is determined in the step S117, that is, not change of the setting content, it is determined, in a step S121 shown in FIG. 16, whether a tap operation to the reset key 64 is performed. If "YES" is determined in the step S121, the setting content is initialized in a step S123, and the process returns to the step S103 shown in FIG. 15. On the other hand, if "NO" is determined in the step S121, it is determined, in a step S125, whether a tap operation to the start key 63 is performed.

If "NO" is determined in the step S125, that is, a tap operation to the start key 63 is not performed, the process returns to the step S103 after performing other processing in a step S127. Although detailed description is omitted, as the other processing, display of screen for directly input fax number, directly input of fax number, display document size setting screen, selection of document size, display setting screen of document reading density, setting density, display setting screen of document reading image quality, setting image quality, display line selection screen, line selection, etc. corresponds. Furthermore, when operating the home button, the control portion 17 forcedly terminates the simple fax processing, and returns to the step S1 shown in FIG. 12 by interruption.

On the other hand, if "YES" is determined in the step S125, that is, if a tap operation to the start key 63 is performed, the process returns to the step S103 after performing fax transmission processing in a step S129.

FIG. 17 and FIG. 18 are flowcharts showing an example of the simple scan processing in the step S19 shown in FIG. 12. In the following, although the simple scan processing will be described, the same processing or similar processing as the already explained processing will be described simply. If the simple scan processing is started as shown in FIG. 17, the scan first screen 71 as shown in FIG. 10(A) is displayed on the operating panel 20 in a step S151. In a next step S153, it is determined whether there is any user operation. If "NO" is determined in the step S153, the process returns to the step S151.

On the other hand, if "YES" is determined in the step S153, it is determined, in a step S155, whether a tap operation to the arrow mark button 45 is performed, or whether a flick operation is performed. If "YES" is determined in the step S155, the scan first screen 71 and the scan second screen 72 as shown in FIGS. 10(A) and 10(B) are replaced with each other in a step S157.

On the other hand, if "NO" is determined in the step S155, it is determined, in a step S159, whether a tap operation to the address book button 75a is performed. If "YES" is determined in the step S159, that is, if a tap operation to the address book button 75a is performed, the address book screen is displayed on the operating panel 20 in a step S161, and the process returns to the step S153. On the other hand, if "NO" is determined in the step S159, that is, if a tap operation to the address book button 75a is not performed, it is determined, in a step S163, whether a tap operation to the history button 75b is performed.

If "YES" is determined in the step S163, that is, if a tap operation to the history button 75b is performed, the history screen 76 of the simple scan mode is displayed on the operating panel 20 in a step S165, and the process returns to the step S153. On the other hand, if "NO" is determined in the step S163, it is determined, in a step S1617, whether the setting content is to be changed. Specifically, when the address book screen 76 is being displayed on the operating panel 20, it is determined whether sorting is selected (changed) as the setting content. Furthermore, when the history screen 76 is being displayed on the operating panel 20, it is determined whether the destination address to be re-transmitted is selected as the setting content.

If "YES" is determined in the step S167, that is, if the setting content is to be changed, change processing of the setting content according to a screen that is being displayed is performed in a step S169, and the process returns to step S153. On the other hand, if "NO" is determined in the step S167, that is, not change of the setting content, it is determined, in a step S171 shown in FIG. 18, whether a tap operation to the reset key 74 is performed. If "YES" is determined in the step S171, the setting content is initialized in a step S173, and the process returns to the step S153 shown in FIG. 17. On the other hand, if "NO" is determined in the step S171, it is determined, in a step S175, whether a tap operation to the start key 73 is performed.

If "NO" is determined in the step S175, that is, a tap operation to the start key 73 is not performed, the process returns to the step S153 after performing other processing in a step S177. Although detailed description is omitted, as the other processing, display of screen for performing global address search, performing global address search, selection body/device saving, display document size setting screen, selection of document size, display setting screen of document reading resolution, setting resolution, display format selection screen, selection of format, on/off of blank sheet skip function, etc. corresponds. Furthermore, when operating the home button, the control portion 17 forcedly terminates the simple scan processing, and returns to the step S1 shown in FIG. 12 by interruption.

On the other hand, if "YES" is determined in the step S175, that is, if a tap operation to the start key 73 is performed, the process returns to the step S153 after performing scan transmission processing in a step S179. In addition, in the step S179, when a tap operation to the monochrome start key 73a is performed, scan transmission processing in monochrome is performed, and when a tap operation to the color start key 73b is performed, scan transmission processing in color is performed.

Although the present invention has been mentioned and illustrated in detail, it is clearly understood that the same is by way of illustration and example only and is not to be taken by way of limitation, the spirit and scope of the present invention being limited only by the terms of the appended claims.

Furthermore, it is intended that the scope of the present invention covers all modifications within the meaning and range of equivalency of the claims.

What is claimed is:

1. A multifunction peripheral having a plurality of operation modes, comprising:
    a display portion configured to display a first user interface image for selecting an operation mode and a second user interface image for setting an operation condition in a selected operation mode, wherein
    the first user interface image has a plurality of first operating icons, and includes a first display region that the plurality of first operating icons for selecting a plurality of operation modes are switchably displayed and a second display region that the plurality of first operating icons are fixedly displayed,
    the second user interface image has a plurality of second operating icons, and includes a third display region that the plurality of second operating icons for setting a plurality of operation conditions are switchably displayed and a fourth display region that the plurality of second operating icons are fixedly displayed,
    the first display region and the third display region have an overlapping area, and the second display region and the fourth display region have an overlapping area,
    the plurality of second operating icons displayed in the third display region are selected by a user operation,
    the plurality of second operating icons includes a start key that instructs performing of image processing and a reset key that instructs clearing set content of the operating conditions,
    the start key and the reset key are displayed in the fourth display region irrespective of the operation mode,
    an entire display region of the display portion has a rectangular shape,
    the start key is displayed along a first lateral side edge of the entire display region, and the reset key is displayed along a second lateral side edge of the entire display region opposite to the first lateral side edge, and
    at least one of the second operating icons, which differs depending on the operation mode, is displayed between the start key and the reset key in the fourth display region.

2. The multifunction peripheral according to claim 1, wherein the overlapping area has an area larger than an area of a non-overlapping area in each of the first display region and the third display region.

3. The multifunction peripheral according to claim 1, wherein the overlapping area has an area larger than an area of a non-overlapping area in each of the second display region and the fourth display region.

4. The multifunction peripheral according to claim 1, wherein the second display region and the fourth display region are provided along the same side edge of the entire display region.

5. The multifunction peripheral according to claim 1, wherein the second display region and the fourth display region are provided in the same corner portion of the entire display region.

6. The multifunction peripheral according to claim 1, wherein an arrangement of the plurality of first operating icons in the first display region and an arrangement of the plurality of second operating icons in the third display region are substantively the same.

7. The multifunction peripheral according to claim 1, wherein a first number of the second operating icons displayed in the third display region is the same as or less than a second number of the first operating icons displayed in the first display region.

8. The multifunction peripheral according to claim 1, wherein the plurality of second operating icons includes a plurality of setting icons configured to set operation conditions, and irrespective of the operation mode, the plurality of setting icons are displayed in the third display region.

9. The multifunction peripheral according to claim 8, wherein the start key is displayed in any one of the corner portions of the entire display region, and the reset key is displayed in another one of the corner portions of the entire display region.

\* \* \* \* \*